United States Patent
Im et al.

(10) Patent No.: US 9,532,104 B2
(45) Date of Patent: Dec. 27, 2016

(54) METHOD AND SERVER FOR THE SOCIAL NETWORK-BASED SHARING OF TV BROADCAST CONTENT RELATED INFORMATION

(75) Inventors: Sung-Bin Im, Yongin-si (KR); Jong-Ho Lea, Seongnam-si (KR); Young-Hwan Lee, Suwon-si (KR); Seung-Hyuk Choi, Suwon-si (KR); Sang-Wook Cho, Hwaseong-si (KR); Chi-Won Kim, Gunpo-si (KR); Soo-Yeoun Yoon, Seoul (KR); Sang-Wook Kang, Anyang-si (KR); Su-Gyeong Hyeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/881,644

(22) PCT Filed: Oct. 25, 2011

(86) PCT No.: PCT/KR2011/008001
§ 371 (c)(1),
(2), (4) Date: Jul. 15, 2013

(87) PCT Pub. No.: WO2012/057509
PCT Pub. Date: May 3, 2012

(65) Prior Publication Data
US 2013/0291037 A1 Oct. 31, 2013

Related U.S. Application Data

(60) Provisional application No. 61/406,289, filed on Oct. 25, 2010.

(51) Int. Cl.
*H04N 7/173* (2011.01)
*H04N 21/462* (2011.01)
(Continued)

(52) U.S. Cl.
CPC ........... *H04N 21/4622* (2013.01); *G06F 3/14* (2013.01); *G06Q 50/01* (2013.01);
(Continued)

(58) Field of Classification Search
CPC ............ H04N 21/4788; H04N 21/4622; H04N 21/4532; H04N 21/252; H04N 21/4758; H04N 21/84; H04N 21/43637; H04N 21/436; H04N 21/64707; H04N 21/2381; G06Q 50/01; H04L 67/104; H04L 12/581; H04L 12/588; H04L 51/04; H04L 12/2805; H04L 65/4084; H04L 65/4076; H04L 51/00; H04L 51/32; H04L 12/1813; G06F 3/14; H04M 1/72552
(Continued)

(56) References Cited

U.S. PATENT DOCUMENTS 7,311,608 B1 * 12/2007 Danieli ................... A63F 13/12
463/42
8,014,763 B2 * 9/2011 Hymes ................... H04M 1/26
455/414.2
(Continued)

FOREIGN PATENT DOCUMENTS

CN 1947391 A 4/2007
CN 101465748 A 6/2009
(Continued)

OTHER PUBLICATIONS

Viki, Viki Screen 1072809v-yong-pal-episode-8, Oct. 9, 2015, http://www.viki.com/videos/1072809v-yong-pal-episode-8.*
(Continued)

*Primary Examiner* — Hoang-Vu A Nguyen-Ba
(74) *Attorney, Agent, or Firm* — Sughrue Mion, PLLC

(57) ABSTRACT

A method and apparatus for transceiving television (TV)-content-related information based on a social network. A TV
(Continued)

content sharing method for providing TV-content-related information to a plurality of TV users based on a social network includes receiving from a TV user a request to check in a TV content sharing service; providing real-time user information regarding users who check in a content checked-in by the TV user, in real time; and providing related service information regarding accessible related services in the social network in relation to the checked-in content.

15 Claims, 24 Drawing Sheets

(51) Int. Cl.
| | | |
|---|---|---|
| H04N 21/45 | (2011.01) | |
| H04N 21/25 | (2011.01) | |
| H04N 21/475 | (2011.01) | |
| H04L 29/08 | (2006.01) | |
| H04L 12/58 | (2006.01) | |
| H04L 12/28 | (2006.01) | |
| G06F 3/14 | (2006.01) | |
| H04N 21/436 | (2011.01) | |
| H04N 21/647 | (2011.01) | |
| H04N 21/2381 | (2011.01) | |
| H04M 1/725 | (2006.01) | |
| H04L 12/18 | (2006.01) | |
| H04N 21/4788 | (2011.01) | |
| G06Q 50/00 | (2012.01) | |
| H04N 21/4363 | (2011.01) | |
| H04N 21/84 | (2011.01) | |
| H04L 29/06 | (2006.01) | |
| G06F 15/16 | (2006.01) | |
| G06F 3/00 | (2006.01) | |

(52) U.S. Cl.
CPC ...... *H04L 12/1813* (2013.01); *H04L 12/2805* (2013.01); *H04L 12/581* (2013.01); *H04L 12/588* (2013.01); *H04L 51/00* (2013.01); *H04L 51/04* (2013.01); *H04L 51/32* (2013.01); *H04L 65/4076* (2013.01); *H04L 65/4084* (2013.01); *H04L 67/104* (2013.01); *H04M 1/72552* (2013.01); *H04N 21/2381* (2013.01); *H04N 21/252* (2013.01); *H04N 21/436* (2013.01); *H04N 21/43637* (2013.01); *H04N 21/4532* (2013.01); *H04N 21/4758* (2013.01); *H04N 21/4788* (2013.01); *H04N 21/64707* (2013.01); *H04N 21/84* (2013.01)

(58) Field of Classification Search
USPC .................. 725/109, 117; 709/206; 715/758
See application file for complete search history.

(56) References Cited

U.S. PATENT DOCUMENTS

| | | | |
|---|---|---|---|
| 8,381,240 B2 | 2/2013 | Jacoby et al. | |
| 8,402,506 B2 | 3/2013 | Mills et al. | |
| 8,505,062 B1* | 8/2013 | Harrenstein | 725/137 |
| 8,700,641 B2 | 4/2014 | Covell et al. | |
| 8,756,629 B2 | 6/2014 | Mito et al. | |
| 2004/0163127 A1* | 8/2004 | Karaoguz | H04L 67/327 725/120 |
| 2005/0262542 A1* | 11/2005 | DeWeese | H04L 12/1818 725/106 |
| 2007/0006277 A1 | 1/2007 | Mills et al. | |
| 2007/0143778 A1* | 6/2007 | Covell et al. | 725/19 |
| 2008/0026694 A1* | 1/2008 | Ramanathan | H04N 5/44508 455/39 |
| 2008/0046915 A1* | 2/2008 | Haeuser | H04N 7/17318 725/25 |
| 2008/0052630 A1* | 2/2008 | Rosenbaum et al. | 715/738 |
| 2008/0222295 A1 | 9/2008 | Robinson et al. | |
| 2009/0015660 A1* | 1/2009 | Vedantham | H04N 7/17318 348/14.09 |
| 2009/0094656 A1 | 4/2009 | Carlucci | |
| 2009/0164600 A1 | 6/2009 | Issa et al. | |
| 2009/0228944 A1 | 9/2009 | Bodlaender | |
| 2009/0271820 A1 | 10/2009 | Choi et al. | |
| 2010/0064307 A1* | 3/2010 | Malhotra et al. | 725/24 |
| 2010/0146559 A1* | 6/2010 | Lee | H04L 12/1822 725/61 |
| 2010/0199340 A1* | 8/2010 | Jonas | G06Q 10/10 726/8 |
| 2010/0218230 A1* | 8/2010 | Oh | H04N 21/2343 725/116 |
| 2010/0242074 A1 | 9/2010 | Rouse et al. | |
| 2011/0106911 A1 | 5/2011 | Sung et al. | |
| 2011/0154404 A1* | 6/2011 | Piepenbrink et al. | 725/53 |
| 2011/0161167 A1* | 6/2011 | Jallapuram | 705/14.49 |
| 2011/0197224 A1* | 8/2011 | Meijer | G06Q 30/02 725/34 |
| 2011/0214148 A1* | 9/2011 | Gossweiler, III | H04N 21/235 725/46 |
| 2012/0030587 A1* | 2/2012 | Ketkar | 715/751 |
| 2012/0036018 A1* | 2/2012 | Feliciano | G06Q 30/02 705/14.66 |

FOREIGN PATENT DOCUMENTS

| | | |
|---|---|---|
| CN | 101557499 A | 10/2009 |
| EP | 2009920 A1 | 12/2008 |
| EP | 2128807 A1 | 12/2009 |
| JP | 2002524935 A | 8/2002 |
| JP | 2007312250 A | 11/2007 |
| JP | 2008-527855 A | 7/2008 |
| JP | 2008527856 A | 7/2008 |
| JP | 2009524273 A | 6/2009 |
| KR | 10-2009-0036896 A | 4/2009 |
| KR | 10-2011-0043141 A | 4/2011 |
| KR | 10-2011-0047703 A | 5/2011 |
| WO | 0013416 A1 | 3/2000 |
| WO | 2009/048299 A2 | 4/2009 |

OTHER PUBLICATIONS

Viki, Viki web site, Oct. 7, 2015, http://us.wow.com/wiki/Viki_ (website).*
Joel Lee, What Does "Beta Software" Really Mean?, Oct. 3, 2013, www.makeuseof.com.*
International Search Report (PCT/ISA/210), dated Apr. 27, 2012, issued by the International Searching Authority in counterpart International Patent Application No. PCT/KR2011/008001.
Written Opinion (PCT/ISA/237), dated Apr. 27, 2012, issued by the International Searching Authority in counterpart International Patent Application No. PCT/KR2011/008001.
http://uxready.tistory.com/33, Jun. 29, 2009, 19 pages.
Communication dated May 7, 2014 issued by the Japanese Patent Office in counterpart Japanese Patent Application No. 2013-536508.
Communication dated Dec. 9, 2014 issued by Japanese Patent Office in counterpart Japanese Patent Application No. 2013-536508.
Communication dated Aug. 11, 2015 issued by the State Intellectual Property Office of P.R. China in counterpart Chinese Patent Application No. 201180062721.X.
Communication dated Jul. 26, 2016, issued by the European Patent Office in counterpart European Application No. 11836601.2.
Cathal Gurrin et al: "Social Recommendation and Visual Analysis on the TV", Proceedings of the ACM Multimedia 2010 International Conference, ACM MM'10 & Co-Located Workshops; Oct. 25-29, 2010, Firenze, Italy, XP055288497 (2 pages total).
Nitya Narasimhan et al: "*CollecTV* Intelligence: a 3-screen 'social search' system for TV and video queries" 2010 6th International Conference on Collaborative Computing: Networking, Applications

(56) References Cited

OTHER PUBLICATIONS and Worksharing (Collaboratecom 2010) Oct. 9-12, 2010, Chicago, IL, USA, IEEE, Piscataway, NJ, USA, XP031865610, (6 pages total).
Alcatel: "AmigoTV: A Social TV Experience Through Triple-Play Convergence", Internet Citation, Feb. 4, 2005, XP002457156 (9 pages total).
Jorge Abreu et al: "2BeOn—Interactive television supporting interpersonal communication", Proceedings of the Eurographics Workshop on Multimedia, Sep. 8, 2001, XP002457155, (10 pages total).
Yuko Konya et al: "Social TV on IPTV", International Broadcasting Conference 2010, XP030082277, Sep. 9, 2010, (8 pages total).
Communication dated Oct. 19, 2016 issued by the State Intellectual Property Office of P.R. China in counterpart Chinese Patent Application No. 201180062721.X.

\* cited by examiner

METHOD AND SERVER FOR THE SOCIAL NETWORK-BASED SHARING OF TV BROADCAST CONTENT RELATED INFORMATION

CROSS-REFERENCE TO RELATED APPLICATION

This application is a National Stage application under 35 U.S.C. §371 of International Application No. PCT/KR2011/008001, filed on Oct. 25, 2011, and claims the benefit of U.S. Provisional Application No. 61/406,289, filed on Oct. 25, 2010 in the United States Patent and Trademark Office, the disclosures of which are incorporated herein by reference in their entireties.

1. Field

Methods and apparatuses consistent with exemplary embodiments relate to digital television (TV) broadcasting for transceiving auxiliary information in relation to digital TV content.

2. Description of Related Art

As individuals strongly desire to express themselves, a social network service (SNS) for forming social relations and maintaining connections between people is increasingly developed. SNS was mainly used to get acquainted and to be entertained but is now productively used, for example, to do business or to share various types of information. Many people use the SNS rather than the Internet search to obtain and utilize latest information because, according to characteristics of connections between acquaintances, information shared due to a recommendation of a friend is more reliable and concise in comparison to information obtained due to a search.

Currently, network environments are improved and people's satisfaction levels on an SNS are also improved. As such, attempts to use an SNS in various fields other than an Internet service are being made.

SUMMARY

One or more exemplary embodiments provide a method and apparatus for sharing TV-content-related information from among a plurality of television (TV) users based on a social network.

According to an aspect of an exemplary embodiment, there is provided a television (TV) content sharing method for providing TV-content-related information to a plurality of TV users based on a social network, the method including receiving from a TV user a request to access a TV content sharing service; providing real-time user information regarding users who access a content accessed by the TV user, in real time; and providing related service information regarding accessible related services in the social network in relation to the accessed content.

According to another aspect of an exemplary embodiment, there is provided a television (TV) broadcast service receiving method for receiving TV-content-related information by a TV device based on a social network, the method including receiving a broadcast stream; receiving from a TV user a request to access a TV content sharing service for providing the TV-content-related information to a plurality of TV users, and transmitting the request to a TV content sharing service management server; receiving from the TV content sharing service management server real-time user information regarding users who access content accessed by the TV user, in real time; receiving from the TV content sharing service management server related service information regarding accessible related services in the social network in relation to the accessed content; and displaying detailed check-in information including the real-time user information and the related service information regarding the accessed content together with a TV content extracted from the received broadcast stream.

According to another aspect of an exemplary embodiment, there is provided a television (TV) broadcast service receiving method for receiving TV-content-related information by a smart device based on a social network, the method including receiving from a TV user having a TV device a request to access a TV content sharing service for providing the TV-content-related information to a plurality of TV users, and transmitting the request to a TV content sharing service management server; receiving from the TV content sharing service management server real-time user information regarding users who access content accessed by the TV user, in real time; receiving from the TV content sharing service management server related service information regarding accessible related services in the social network in relation to the accessed content; and displaying detailed access information and social network service (SNS) information regarding the accessed content in relation to a TV content displayed on the TV device of the TV user.

According to another aspect of an exemplary embodiment, there is provided a television (TV) content sharing service management server for providing TV-content-related information to a plurality of TV users based on a social network, the server including a check-in management unit that receives from a TV user a request to access a TV content sharing service and determining whether to permit the TV user to access the TV content sharing service a user personal information management unit that manages personal information of a plurality of TV users registered to the TV content sharing service in the social network; a real-time user information management unit that manages real-time user information regarding users who access content accessed by the TV user, in real time; and a related service information management unit that manages related service information regarding accessible related services in the social network in relation to the accessed content.

According to another aspect of an exemplary embodiment, there is provided a television (TV) device for receiving TV-content-related information based on a social network, the TV device including a broadcast reception unit that receives a broadcast stream; a user interface unit that receives various requests from a TV user; a check-in request unit that receives via the user interface unit a request to check in a TV content sharing service for providing the TV-content-related information to a plurality of TV users, and transmits the request to a TV content sharing service management server; a detailed check-in information reception unit that receives from the TV content sharing service management server real-time user information regarding users who access a content accessed by the TV user, in real time, and related service information regarding accessible related services in the social network in relation to the accessed content; and a display unit that displays detailed check-in information including the real-time user information and the related service information regarding the accessed content together with a TV content extracted from the received broadcast stream.

According to another aspect of an exemplary embodiment, there is provided a smart device for receiving TV-content-related information based on a social network, the smart device including: a user interface unit that receives various requests from a television (TV) user having the smart device and a TV device; a check-in request unit that receives via the user interface unit from the TV user a request to access a TV content sharing service for providing the TV-content-related information to a plurality of TV users, and transmits the request to a TV content sharing service management server; a detailed check-in information reception unit that receives from the TV content sharing service management server real-time user information regarding users who access a content accessed by the TV user, in real time, and related service information regarding accessible related services in the social network in relation to the accessed content; and a display unit for displaying detailed access information including the real-time user information and the related service information regarding the accessed content.

DETAILED DESCRIPTION OF EXEMPLARY EMBODIMENTS

Hereinafter, a television (TV) content sharing service management server for providing a TV content sharing service based on a social network, a TV device and a smart device for receiving a TV content sharing service by using a TV content sharing service management server, and methods of operating the TV content sharing service management server, the TV device, and the smart device, according to exemplary embodiments, will be described in detail with reference to the attached drawings.

In a television (TV) content sharing service based on a social network, according to an exemplary embodiment, TV users who check in the TV content sharing service may obtain wider social network service (SNS) information or broadcast information in relation to TV content and may be encouraged to participate in social activities based on a social group formed in relation to the TV content.

Figure 1:
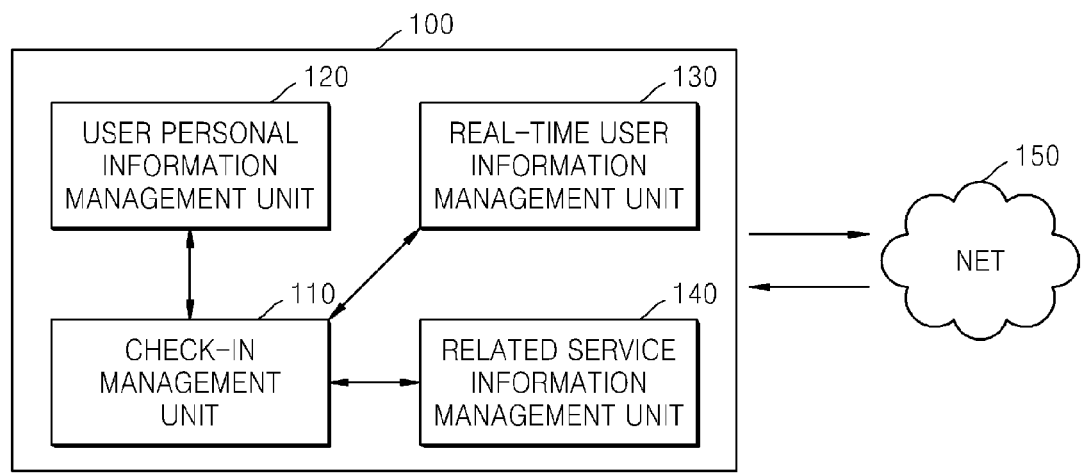
FIG. 1 is a block diagram of a television (TV) content sharing service management server based on a social network, according to an exemplary embodiment.

FIG. 1 is a block diagram of a TV content sharing service management server 100 based on a social network, according to an exemplary embodiment. Hereinafter, for convenience of explanation, 'a TV content sharing service management server based on a social network' will be referred to as 'a TV content sharing server'.

The TV content sharing server 100 provides TV-content-related information to a plurality of TV users using a network 150. The TV content sharing server 100 may manage and provide a TV content sharing service to TV users so as to allow the TV users to share TV content and related information using the network 150, such as a social network.

The TV content sharing server 100 includes a check-in management unit 110, a user personal information management unit 120, a real-time user information management unit 130, and a related service information management unit 140. Elements of the TV content sharing server 100, e.g., the check-in management unit 110, the user personal information management unit 120, the real-time user information management unit 130, and the related service information management unit 140, may operate under the control of a central processing unit (CPU) included in the TV content sharing server 100 or an external control device connected to the TV content sharing server 100.

The check-in management unit 110 may receive a request to access the TV content sharing service from a TV user who accesses the network 150 provided by the TV content sharing server 100. The user personal information management unit 120 may manage personal information of a plurality of TV users registered to the TV content sharing service in the social network.

The check-in management unit 110 may determine whether to accept the request based on the personal information stored in the user personal information management unit 120. The personal information in the social network may include identification (ID) information of a user, information regarding a TV device (see 200 in FIG. 2) or a smart device (see 300 in FIG. 3) registered by the user, a social network service (SNS) account of the user, etc. Also, the personal information in the social network may include personal content information related to the TV content sharing service, for example, a watching history, user preference, and a watching schedule of a TV user regarding the TV content. Information shared with other users based on the social network provided by using the TV content sharing service may be included in the personal information.

If the check-in management unit 110 accepts the TV user request, the real-time user information management unit 130 and the related service information management unit 140 may provide detailed check-in information to the TV user.

The real-time user information management unit 130 manages real-time user information regarding users who access content accessed by the TV user, in real time. The real-time user information management unit 130 may provide the real-time user information regarding the accessed content to the TV user.

The related service information management unit 140 manages related service information regarding accessible related services in the social network in relation to the accessed content. The related service information management unit 140 may provide the related service information regarding the accessed content to the TV user.

The real-time user information management unit 130 may manage the real-time user information including information regarding at least one of a total number of other logged-in users who watch the content accessed by the TV user in real time, a watch together or conversation function of each TV user, a participation level of each TV user in relation to the accessed content, and users having high participation levels from among the TV user and other users. The real-time user information management unit 130 may transmit information requested by the TV user and included in the real-time user information.

The related service information management unit 140 may receive a request to provide related SNS information generated in real time in the social network in relation to the content accessed by the TV user. As such, the related service information management unit 140 may search for and provide the related SNS information related to the accessed content, to the TV user.

The related service information management unit 140 may receive from a current TV user a request to publish the related SNS information in real time in relation to the accessed content. The related service information management unit 140 may connect the related SNS information related to the accessed content, to a personal SNS account of the current TV user, according to the request of the TV user.

The related service information management unit 140 may provide to the TV user recommendation information regarding a target closely related to the accessed content in the social network. For example, official website information or official SNS account information of a predetermined target of the accessed content may be provided to the TV user.

The TV content sharing server 100 may receive from the TV user a request to search for detailed information related to the accessed content. For example, a request to search for detailed information such as crews, casts, background music, and shooting locations of the accessed content may be received and the detailed information may be provided to the TV user.

Also, the TV content sharing server 100 may receive from the TV user a request to provide a personal posting regarding the accessed content or the detailed information to a personal SNS account.

The TV content sharing server 100 may receive a request to log in from an auxiliary smart device other than a main TV of the TV user. The TV content sharing server 100 may also provide to the auxiliary smart device the detailed check-in information including the real-time user information and the related service information regarding a requested content.

The TV content sharing server 100 may receive from the TV user a text message for participating in broadcasting of the accessed content. The TV content sharing server 100 may filter the text message. The TV content sharing server 100 may provide to the TV user the filtered text message in the form of a ticker, together with the broadcasted content.

The TV content sharing server 100 may provide to the TV user a social community service based on the accessed content. Official information connected to a social community and related to the accessed content may be provided. For example, information regarding an official website or an official SNS account of a crew or a cast of the accessed content may be provided to the TV user.

The TV content sharing server 100 may receive from the TV user a request to display real-time reply information regarding the accessed content. The TV content sharing server 100 may provide a real-time-reply-based service based on the requested real-time reply information regarding a current content from a plurality of TV users. For example, at least one of a watching encouraging service, a reply participating service, and a reply viewing service may be provided based on the real-time reply information of the plurality of TV users.

The TV content sharing server 100 may provide a graphic user interface for displaying menus of the real-time user information and the related service information regarding the content accessed by the TV user, which are selected by the TV user, on a TV of the TV user. Whenever the TV user requests predetermined information, the TV content sharing server 100 may transmit the detailed check-in information regarding the selected menus to the TV user.

The TV content sharing server 100 may further include a content community management unit (not shown) for managing the social community service based on the accessed content. The content community management unit may provide official information connected to a social community and related to the accessed content.

The TV content sharing server 100 may further include a group of interest management unit (not shown) for managing group of interest information regarding a group of interest including users of interest of the TV user. The group of interest information may include status information regarding access states of and contents watched by the users of interest of the TV user.

The group of interest management unit may receive from the TV user a request to watch content together with another user from among the users of interest. The group of interest management unit may provide an opinion sharing service regarding the accessed content between the TV user and the other who accepts the request to watch content together with the TV user. The opinion sharing service may include at least one service from among text chatting, emoticons, voice chatting, and video chatting between the TV user and the other user.

Also, the group of interest management unit may receive from the TV user a request for video chatting with the other user from among the users of interest. Besides, while the other user who accepts video chatting and the TV user perform video chatting, if a request to share a predetermined content is received, the group of interest management unit may provide a service of sharing the requested content.

The TV content sharing server 100 may further include a social commerce management unit (not shown) for managing social commerce information related to the content accessed by the TV user. According to an exemplary embodiment, the social commerce information related to the accessed content may include at least one of purchase histories, purchase opinions, and purchase statuses of items related to the accessed content, which are obtained from at least one user from among the users of interest of the TV user and real-time viewers.

The TV content sharing server 100 may provide to the TV user local information obtained from at least one user registered to a region where a TV device of the TV user is located, from among the users of interest of the TV user and real-time viewers.

If information generated and updated by elements for generating and managing detailed check-in information, e.g., the real-time user information management unit 130, the related service information management unit 140, the group of interest management unit, and the social commerce management unit, is generated, changed, or updated in relation to a user registered to the TV content sharing server 100, the personal information stored in the user personal information management unit 120 may be generated, changed, or updated.

Due to an activity of the checked-in TV user, the personal information of the TV user may be updated, and the updated personal information may be stored in the user personal information management unit 120.

The TV content sharing server 100 may transmit to the TV user the detailed access information for providing the TV content sharing service, together with a broadcast stream including the TV content.

Alternatively, separately from a device for transmitting the broadcast stream, the TV content sharing server 100 may transmit only the detailed access information for providing the TV content sharing service.

Figure 2:
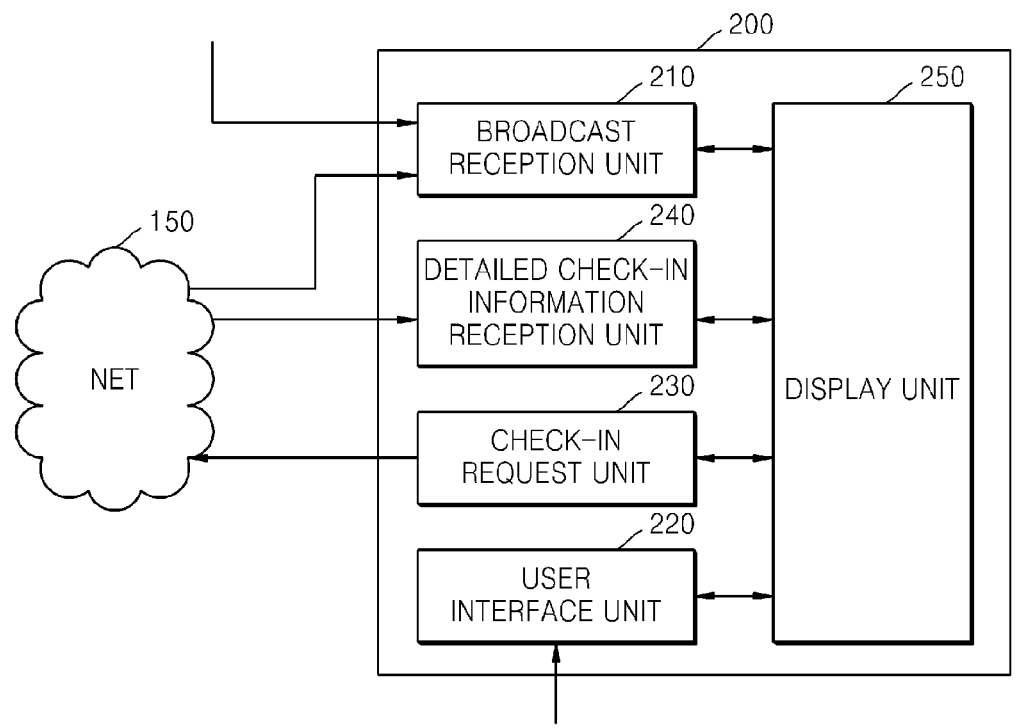
FIG. 2 is a block diagram of a TV device for receiving TV-content-related information based on a social network, according to an exemplary embodiment.

FIG. 2 is a block diagram of a TV device 200 for receiving TV-content-related information based on a network 150 such as a social network, according to an exemplary embodiment. Hereinafter, for convenience of explanation, 'a TV device for receiving TV-content-related information based on a social network' is referred to as 'a TV device'.

The TV device 200 receives TV-content-related information provided to a plurality of TV users, based on the network 150 from the TV content sharing server 100. The TV device 200 may receive a TV content sharing service provided by the TV content sharing server 100, based on the network 150 including a social network.

The TV device 200 includes a broadcast reception unit 210 for receiving a broadcast stream, a user interface unit 220 for receiving various requests from a TV user, and a display unit 250 for displaying a TV content. Also, the TV device 200 further includes a check-in request unit 230 and a detailed check-in information reception unit 240 in relation to the TV content sharing service.

The broadcast reception unit 210, the user interface unit 220, the check-in request unit 230, the detailed check-in information reception unit 240, and the display unit 250 of the TV device 200 may intimately operate by the control of a CPU included in or an external control device connected to the TV device 200.

The check-in request unit 230 receives via the user interface unit 220 a request of a TV user of the TV device 200 to log in to the TV content sharing service for providing the TV-content-related information to a plurality of TV users. The check-in request unit 230 may transmit the request of the TV user to the TV content sharing server 100.

The TV device 200 may be registered as a TV device of the TV user by the user personal information management unit 120 of the TV content sharing server 100. As such, the TV device 200 may be accepted by the TV content sharing server 100 to log in.

If the TV device 200 is logged in, the detailed check-in information reception unit 240 may receive from the TV content sharing server 100 real-time user information regarding a content accessed by the TV user. Also, the detailed check-in information reception unit 240 may receive from the TV content sharing server 100 related service information regarding accessible related services in the social network in relation to the content accessed by the TV user.

If a request to search for related SNS information generated in real time in relation to the accessed content is input via the user interface unit 220 from the TV user, the TV device 200 may transmit the request to search for the related SNS information to the TV content sharing server 100. The detailed check-in information reception unit 240 may receive the found related SNS information from the TV content sharing server 100.

If a request to publish the related SNS information in real time in relation to the accessed content is input via the user interface unit 220 from the TV user, the TV device 200 may transmit the request to publish the related SNS information to the TV content sharing server 100. The detailed check-in information reception unit 240 may receive information regarding a result of connecting the related SNS information related to the accessed content, to a personal SNS account of a current TV user.

The detailed check-in information reception unit 240 may receive recommendation information regarding a target closely related to the accessed content in the social network.

The TV device 200 may receive a request to search for detailed information related to the accessed content, via the user interface unit 220 from the TV user, and may transmit the request to the TV content sharing server 100. Besides, if a request to provide a personal posting regarding the detailed information of the accessed content to a personal SNS account of the TV user is input via the user interface unit 220, the TV device 200 may transmit the request to the TV content sharing server 100.

Also, the TV device 200 may receive from the TV user a text message for participating in broadcasting of the accessed content, and may transmit the text message to the TV content sharing server 100. As such, the detailed check-in information reception unit 240 may receive filtered text messages from the TV content sharing server 100 in the form of a ticker.

The detailed check-in information reception unit 240 may receive from the TV content sharing server 100 a social community service based on the accessed content. Also, the detailed check-in information reception unit 240 may receive official information connected to a social community and related to the accessed content.

The TV device 200 may receive from the TV user a request to display real-time reply information regarding the accessed content, and may transmit the request to the TV content sharing server 100.

Also, the TV device 200 may receive the real-time reply information of the TV user and real-time users from the TV content sharing server 100. The TV device 200 may receive from the TV content sharing server 100 at least one of a watching encouraging service, a reply participating service, and a reply viewing service based on the real-time reply information.

The TV device 200 may receive a graphic user interface for displaying only menus of the real-time user information, the related service information, the group of interest information, the social commerce information, and the real-time reply information regarding the checked-in content, which are selected by the TV user, on the TV device 200.

Also, the display unit 250 of the TV device 200 may display to the TV user the menus selected from various types of detailed access information regarding the accessed content, together with the TV content.

The detailed check-in information reception unit 240 may receive the group of interest information including status information of a group of interest including users of interest of the TV user.

The TV device 200 receives from the TV user a request to watch content together with another user from among the users of interest, and may transmit the request to the TV content sharing server 100. As such, the TV device 200 may receive from the TV content sharing server 100 an opinion sharing service regarding the accessed content between the TV user and the other user.

The TV device 200 may receive the opinion sharing service including at least one service from among text chatting, emoticons, voice chatting, and video chatting while the TV user and the other user watch content together.

The TV device 200 may receive from the TV user a request to do video chatting with the first user from among the users of interest, and may transmit the request to the TV content sharing server 100. Also, the TV device 200 may receive a request to share a predetermined content while the TV user and the other user perform video chatting, and may transmit the request to the TV content sharing server 100. As such, the detailed check-in information reception unit 240 may receive a service for sharing the requested content via video chatting from the TV content sharing server 100.

The detailed check-in information reception unit 240 may receive from the TV content sharing server 100 social commerce information including at least one of purchase histories, purchase opinions, and purchase statuses of items related to the accessed content, which are obtained from at least one user from among the users of interest of the TV user and real-time viewers.

The detailed check-in information reception unit 240 may receive from the TV content sharing server 100 local information obtained from at least one user registered to a region where the TV device 200 is located, from among the users of interest of the TV user and real-time viewers.

The display unit 250 may display the detailed access information including the real-time user information and the related service information regarding the accessed content, together with a TV content extracted from a received broadcast stream.

Figure 3:
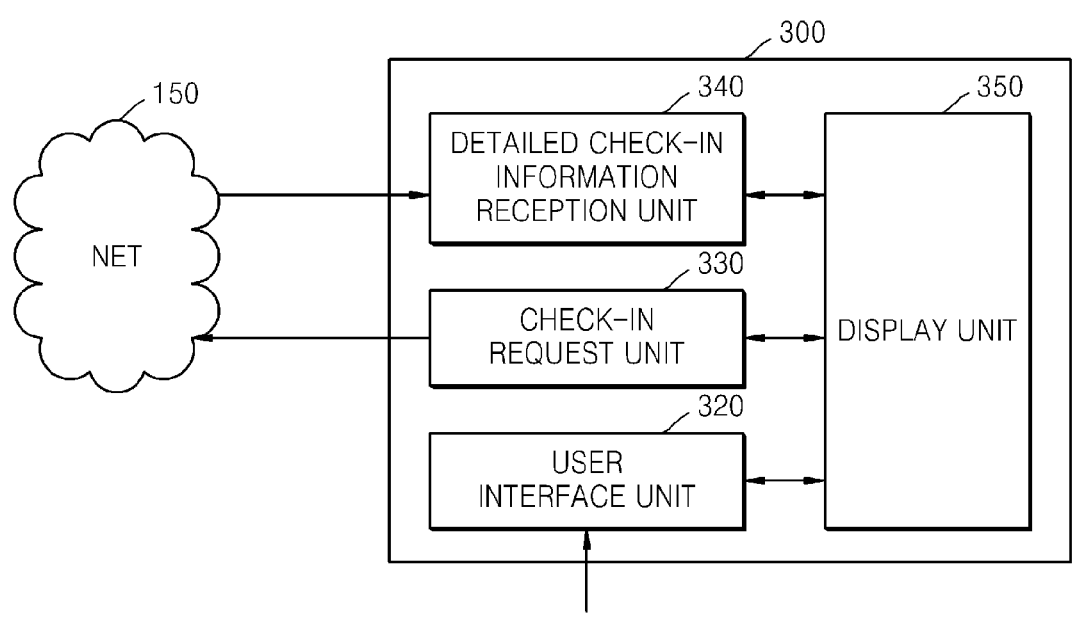
FIG. 3 is a block diagram of a smart device for receiving TV-content-related information based on a social network, according to an exemplary embodiment.

FIG. 3 is a block diagram of a smart device 300 for receiving TV-content-related information based on a social network, according to an exemplary embodiment.

Hereinafter, for convenience of explanation, 'a smart device for receiving TV-content-related information based on a social network' is referred to as 'a smart device'.

The smart device 300 receives TV-content-related information provided to a plurality of TV users, based on the network 150 from the TV content sharing server 100. The smart device 300 may receive a TV content sharing service provided by the TV content sharing server 100, based on the network 150 including a social network.

The smart device 300 may be a mobile device, e.g., a mobile phone, a smartphone, a laptop computer, or an e-book, an auxiliary device, or a TV device other than the TV device 200, which is owned by a TV user of the TV device 200.

The smart device 300 includes a user interface unit 320 for receiving various requests from the TV user, and further includes a check-in request unit 330 and a detailed check-in information reception unit 340 in relation to the TV content sharing service. Also, the smart device 300 includes a display unit 350 for displaying detailed check-in information.

The user interface unit 320, the check-in request unit 330, the detailed check-in information reception unit 340, and the display unit 350 of the smart device 300 may intimately operate under the control of a CPU included in the smart device 300 or in an external control device connected to the smart device 300.

The check-in request unit 330 receives via the user interface unit 320 a request of the TV user to access the TV content sharing service. The check-in request unit 330 may transmit the request of the TV user to the TV content sharing server 100.

The smart device 300 may be registered as a smart device or an auxiliary device of a TV device of the TV user by the user personal information management unit 120 of the TV content sharing server 100. As such, the smart device 300 may be accepted by the TV content sharing server 100 to check in.

If the smart device 300 is logged in, the detailed check-in information reception unit 340 may receive from the TV content sharing server 100 detailed access information including real-time user information and related service information regarding a content checked in by the TV user.

In addition, like the detailed check-in information reception unit 240 of the TV device 200, the detailed check-in information reception unit 340 of the smart device 300 may receive from the TV content sharing server 100 group of interest information, social commerce information, and real-time reply information in relation to the accessed content.

Also, like the user interface unit 220 of the TV device 200, the user interface unit 320 of the smart device 300 may receive various access-related requests from the TV user, and may transmit the request to the TV content sharing server 100.

The display unit 350 of the smart device 300 may display the detailed access information and related SNS information regarding the accessed content in relation to a TV content displayed on the TV device 200 of the TV user.

Various examples in which a TV content sharing service provided by the TV content sharing server 100 is realized on the TV device 200 or the smart device 300 by accepting a TV user of the TV device 200 or the smart device 300 to access the TV content sharing service will now be described in detail with reference to FIGS. 4 through 22.

Figure 4:
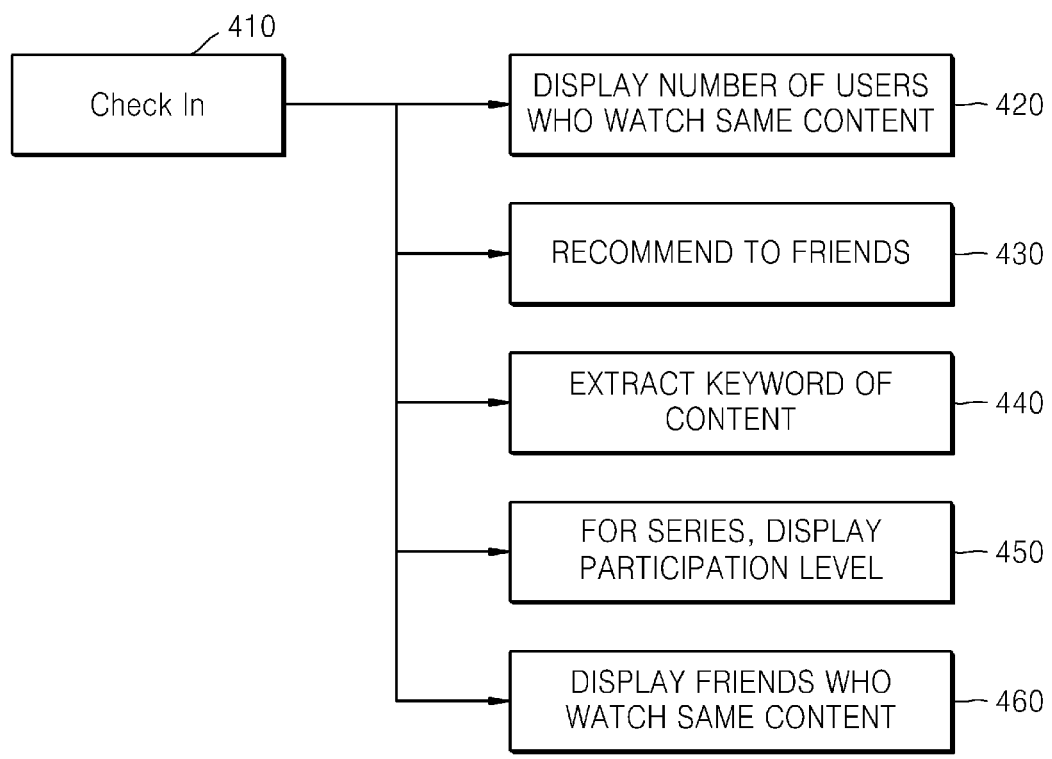
FIG. 4 shows TV content sharing examples when a TV user checks in a TV content sharing service provided by a TV content sharing service management server, according to exemplary embodiments.

FIG. 4 shows TV content sharing examples when a TV user checks in a TV content sharing service provided by the TV content sharing server 100, according to exemplary embodiments.

The TV user may check in the TV content sharing service provided by the TV content sharing server 100, by using the TV device 200 or the smart device 300 (s410). The TV content or a predetermined target of the TV content may be accessed. The TV content sharing service may allow TV users to share information regarding the accessed target. Various sharing examples in which the TV content is accessed will now be described in detail.

According to sharing example 420, if the TV content is accessed, the TV device 200 or the smart device 300 may display the number of users who watch the same content. Also, due to the TV content sharing service, preference of a user related to the content may be analyzed. For example, if a sport game content is currently accessed, information regarding a team supported by the user may be stored in the TV content sharing server 100. If a music program content is currently accessed, information regarding a favorite singer of the user may be stored in the TV content sharing server 100.

Also, preference information regarding the preference of each user may be provided to logged-in users together with the content. For example, if a current program is a sport game content or a music program content, based on the preference information of logged-in users who watch the current program, together with a content play screen, auxiliary information for comparing the numbers of fans who like different teams (players) or singers may be displayed on the TV device 200 or the smart device 300. The sharing example 420 may be an example when the real-time user information described above in relation to FIGS. 1, 2, and 3 is used.

According to sharing example 430, a current TV user may recommend a content accessed by the current TV user, to friends also registered to the TV content sharing service. Also, together with a content play screen, the number of friends who decide to watch the content due to the recommendation of the current TV user may be displayed on the TV device 200 or the smart device 300. The friends in the sharing example 430 may be the users of interest described above in relation to FIGS. 1, 2, and 3, and the sharing example 430 may be an example when the group of interest information is used.

According to sharing example 440, a keyword may be extracted from a accessed content and may be provided to a TV user. Also, in a connected social network, if a real-time interest or a search frequency of the TV user on the keyword of the accessed content, together with a content play screen, the keyword may be displayed on the TV device 200 or the smart device 300. The sharing example 440 may be an example when the related service information described above in relation to FIGS. 1, 2, and 3 is used.

According to sharing example 450, if an accessed content is a series, continuous participation level information of a TV user may be analyzed and provided to the TV user. If the TV user has a high participation level, the TV user may have a high authority on the content in a social community or may have a wide range of activity. For example, a user having the highest participation level in relation to the accessed content, the user may become a master user. The master user may personally relay the content. Also, with respect to a series in which the TV user actively participates, an automatic reservation function or a recommendation function to watch the series may be provided. The sharing example 450 may be an example when the user personal information described above in relation to FIGS. 1, 2, and 3 is used.

According to sharing example 460, information regarding friends who watch a content the same as the content that a TV user watch may be provided. The TV content sharing service may provide a watch together service to the TV user such that friends watch the same content together and share their opinions. By using the TV content sharing service, the TV user may invite or recommend a friend for the watch together service, or may accept an invitation from a friend. The sharing example 460 may be another example when the group of interest information described above in relation to FIGS. 1, 2, and 3 is used.

Figure 5:
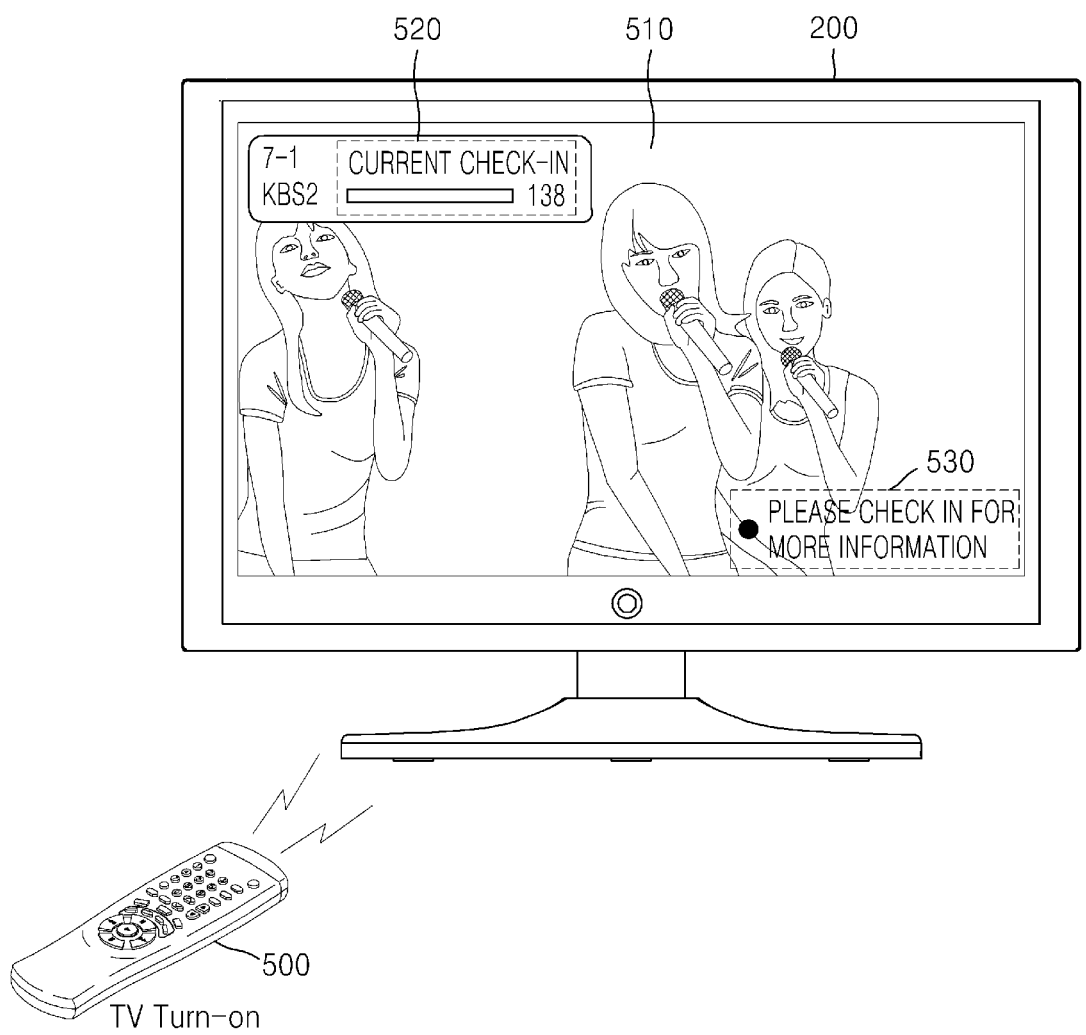
FIGS. 5 and 6 respectively show a screen before a TV content sharing service is checked in and an initial screen after the TV content sharing service is accessed, according to exemplary embodiments.
Figure 6:
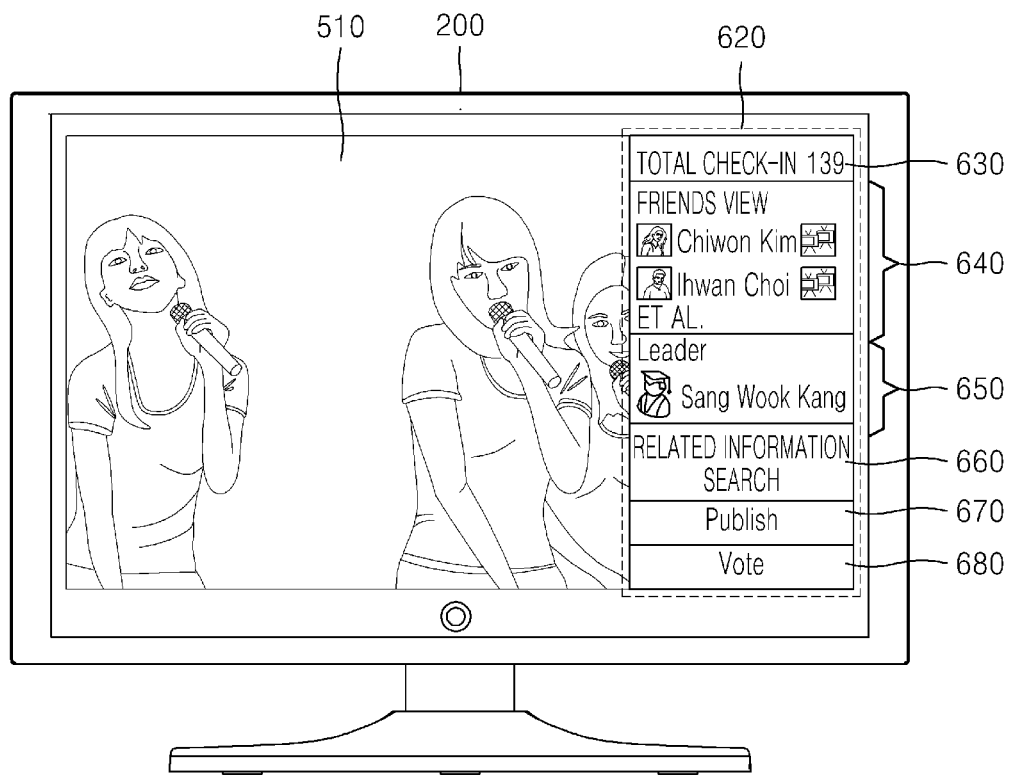
Figure 7:
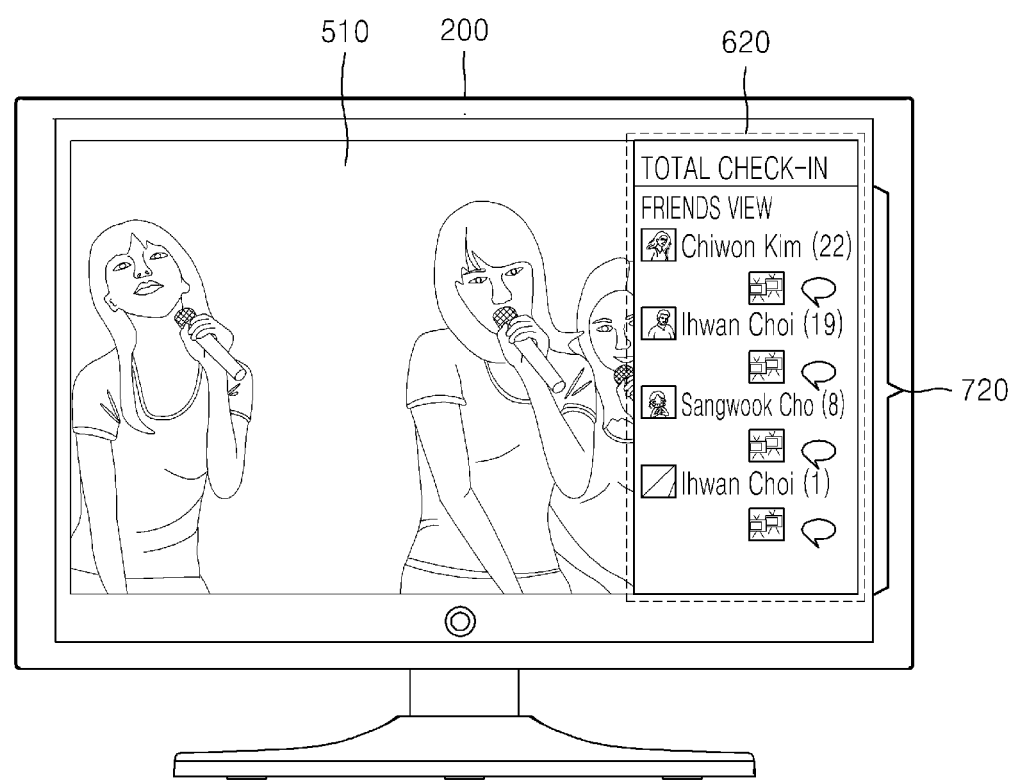
FIGS. 7, 8, 9, and 10 respectively show screens when a friend list menu, a participation level menu, related information menus, and a vote menu of detailed access information of a TV content sharing service are selected, according to exemplary embodiments.
Figure 8:
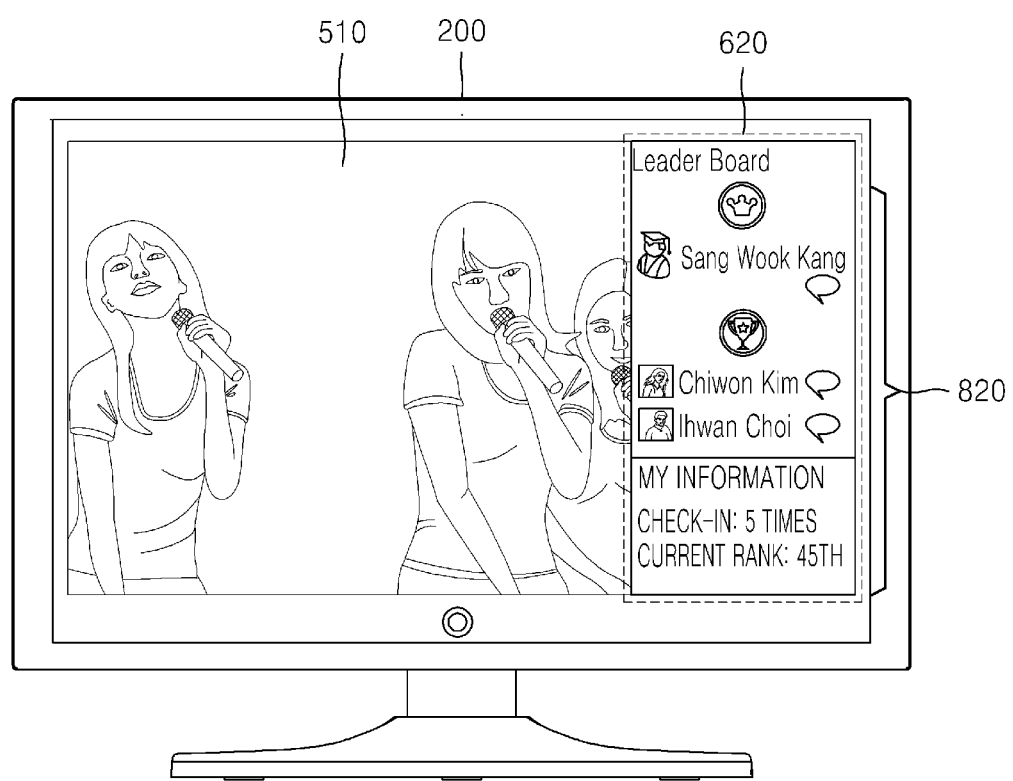
Figure 9:
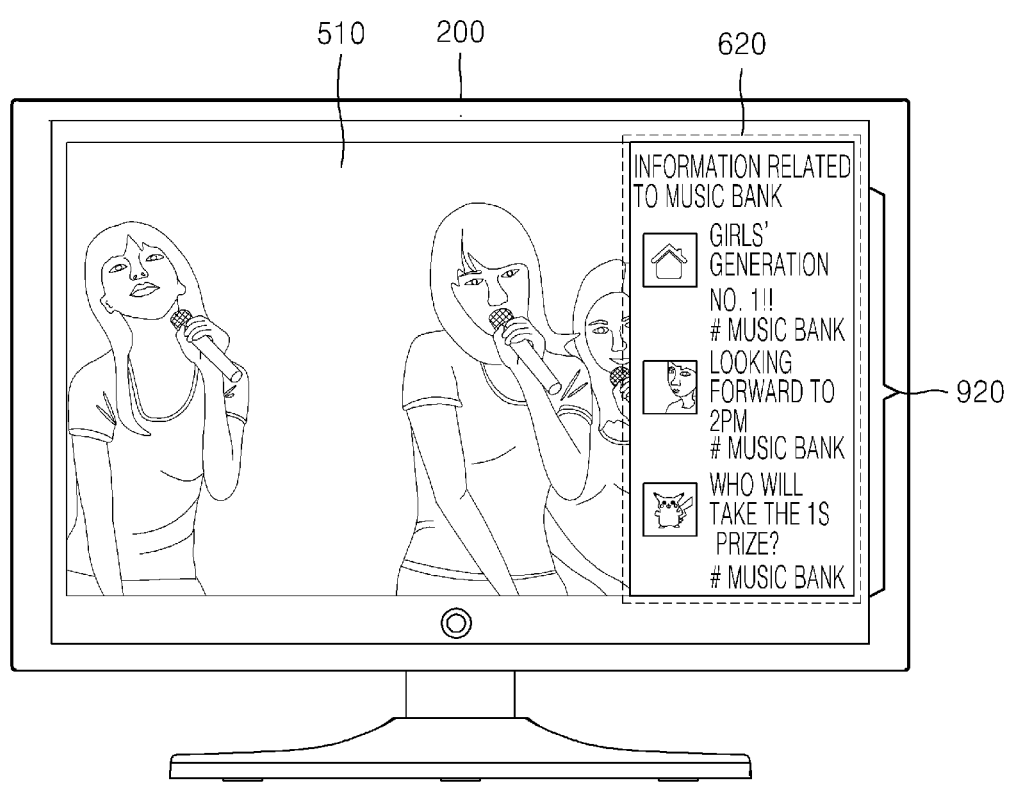
Figure 10:
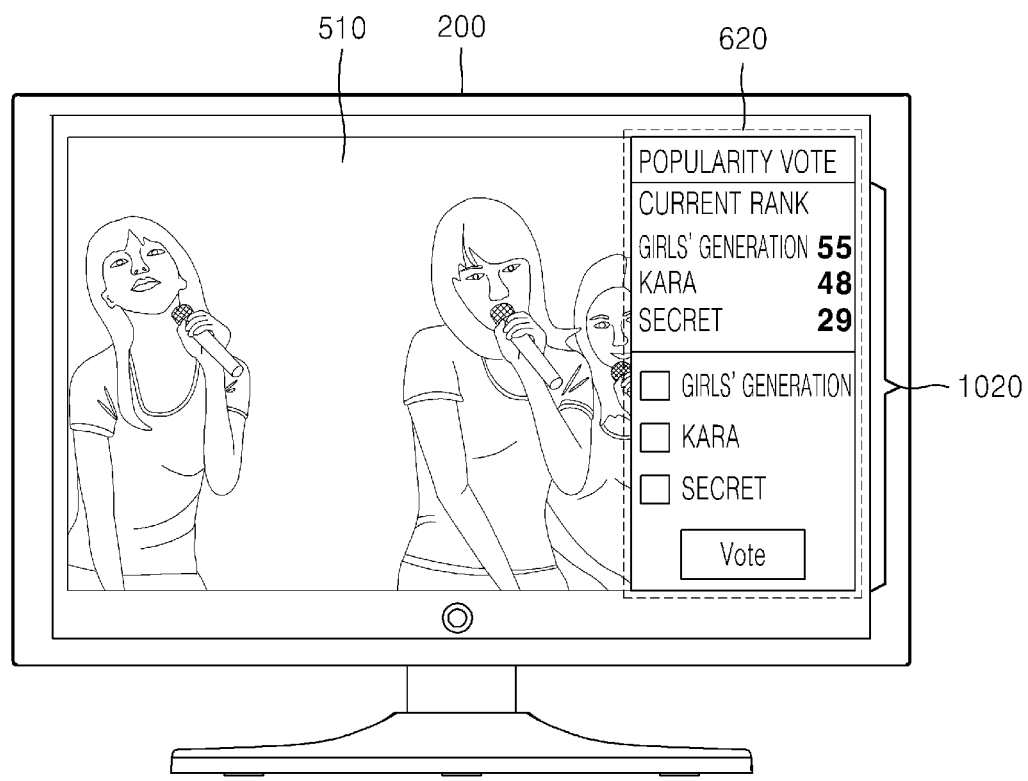

FIGS. 5 and 6 respectively show a screen before a TV content sharing service is accessed and an initial screen after the TV content sharing service is accessed, according to exemplary embodiments.

If a TV user 500 changes channels while watching TV on the TV device 200, a new content 510 may be played and an auxiliary window 520 for displaying the number of users who check in the current content 510 may be displayed. Also, check-in encouraging information 530 for encouraging to check in may be displayed on the TV device 200. At least one of the auxiliary window 520 and the check-in encouraging information 530 may be provided due to the TV content sharing service. The auxiliary window 520 or the check-in encouraging information 530 may be eliminated from the screen automatically or according to a user setup.

If the TV user 500 requests access and is accepted, the TV device 200 may receive detailed access information from the TV content sharing server 100. The TV device 200 may display the received detailed access information on a sharing information display window 620 while displaying the content 510. For example, after the TV user 500 is logged in, the initial screen displayed on the sharing information display window 620 may include a user number menu 630 representing a total number of users who access the current content 510, a friend list menu 640 in relation to the current content 510, a participation level menu 650, related information search and publish menus 660 and 670, and a vote menu 680.

FIGS. 7, 8, 9, and 10 respectively show screens when the friend list menu 640, the participation level menu 650, the related information search and publish menus 660 and 670, and the vote menu 680 of detailed access information of a TV content sharing service are selected, according to exemplary embodiments.

Initially, if the friend list 640 is selected by the TV user 500, the TV content sharing server 100 may transmit watching status information 720 of users of interest of the TV user 500, i.e., friends, who watch the current content 510. As such, the sharing information display window 620 of the TV device 200 may display friends who watch the current content 510 and the watching status information 720 of each friend.

For example, information regarding a participation level, a watch together possibility, and a chatting possibility may be checked due to the watching status information 720 of the friends. A participation level regarding a content may be displayed as the number of accesses while the content is broadcasted, an attendance rate, etc.

If the participation level 650 is selected by the TV user 500, the TV content sharing server 100 may transmit a list of a master user having the highest participation level from among users who access the current content 510, and high-ranked users having high participation levels, and participation level information 820 of a current user. As such, the sharing information display window 620 of the TV device 200 may display the list of the master user and the high-ranked users, and the participation level information 820 of the current user.

Due to the participation level information, a competition may be caused between TV users, a motive for a more frequent access may be provided, and active participation in the TV content sharing service may be encouraged.

If the related information search menu 660 is selected by the TV user 500, the TV content sharing server 100 may search for and transmit SNS information 920 generated in real time in a social network in relation to the current content 510. As such, the sharing information display window 620 of the TV device 200 may display the SNS information 920 generated in real time in relation to the current content 510. For example, a real-time program used in an SNS in relation to the current content 510 may be found and a result thereof may be displayed.

Also, if the related information publish menu 670 is selected by the TV user 500, the SNS information 920 generated in real time may be registered to a personal SNS account of the TV user 500, for example, a Twitter or Facebook account.

If the vote 680 is selected by the TV user 500, the TV content sharing server 100 may transmit real-time vote information 1020 between users in relation to the current content 510. As such, the sharing information display window 620 of the TV device 200 may display a real-time vote window according to the real-time vote information 1020 regarding the current content 510.

According to an exemplary embodiment, preference/non-preference information generated as a result of votes of TV users may be stored as metadata and may be transmitted to the TV content sharing server 100. A vote service related to a TV content may be expanded and various used in cooperation with a TV content provider.

Figure 11:
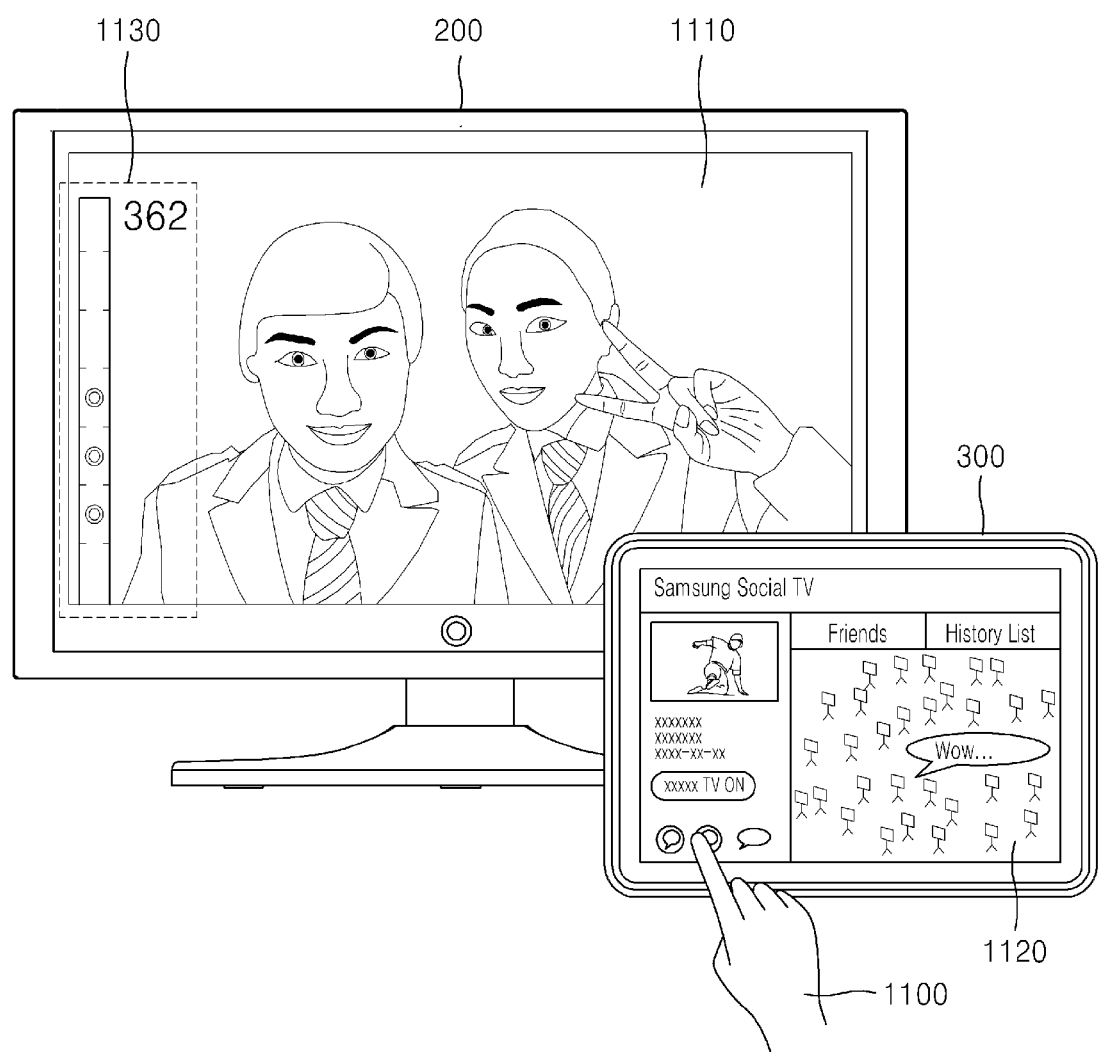
FIG. 11 shows an example when a TV device and an auxiliary smart device checked in a TV content sharing service are used, according to an exemplary embodiment.

FIG. 11 shows an example when the TV device 200 and the smart device 300 checked in a TV content sharing service are used, according to an exemplary embodiment.

A TV user 1100 may have both of the TV device 200 and the smart device 300. The smart device 300 may be used as an auxiliary device when the TV content sharing service of the TV device 200 is used.

For example, the TV user 1100 already accesses the TV content sharing service by using the TV device 200 and currently watches a TV content 1110. The TV user 1100 may also access the TV content sharing service by using the smart device 300.

Since information regarding the TV content 1110 that the TV user 1100 currently watches on the TV device 200 may be shared by the TV content sharing server 100 in a social network, the checked-in smart device 300 may check by using an SNS the information regarding the TV content 1110 that the TV user 1100 currently watches.

Accordingly, the TV user 1100 may watch the TV content 1110 by using the TV device 200 and may check sharing information 1120 regarding the currently watching TV content 1110 by using the checked-in smart device 300.

The sharing information 1120 displayed on the smart device 300 may include all types of detailed access information. For example, the detailed access information including a friend list menu for displaying a list of friends who currently watch the TV content 1110, an opinion sharing menu for sharing opinions with a friend, a preference/vote participation menu, a watch together menu, and a friend search menu for searching for friends who watch other contents may be provided by the smart device 300, and the TV device 200 may play only the TV content 1110.

Alternatively, even when the smart device 300 is also logged in, the TV device 200 may display real-time information such as the number of users who currently check in the TV content 1110, the number of friends who also watch the TV content 1110, or information regarding persons concerned by using a simple display 1130 such as a bar graph or a color display.

Figure 12:
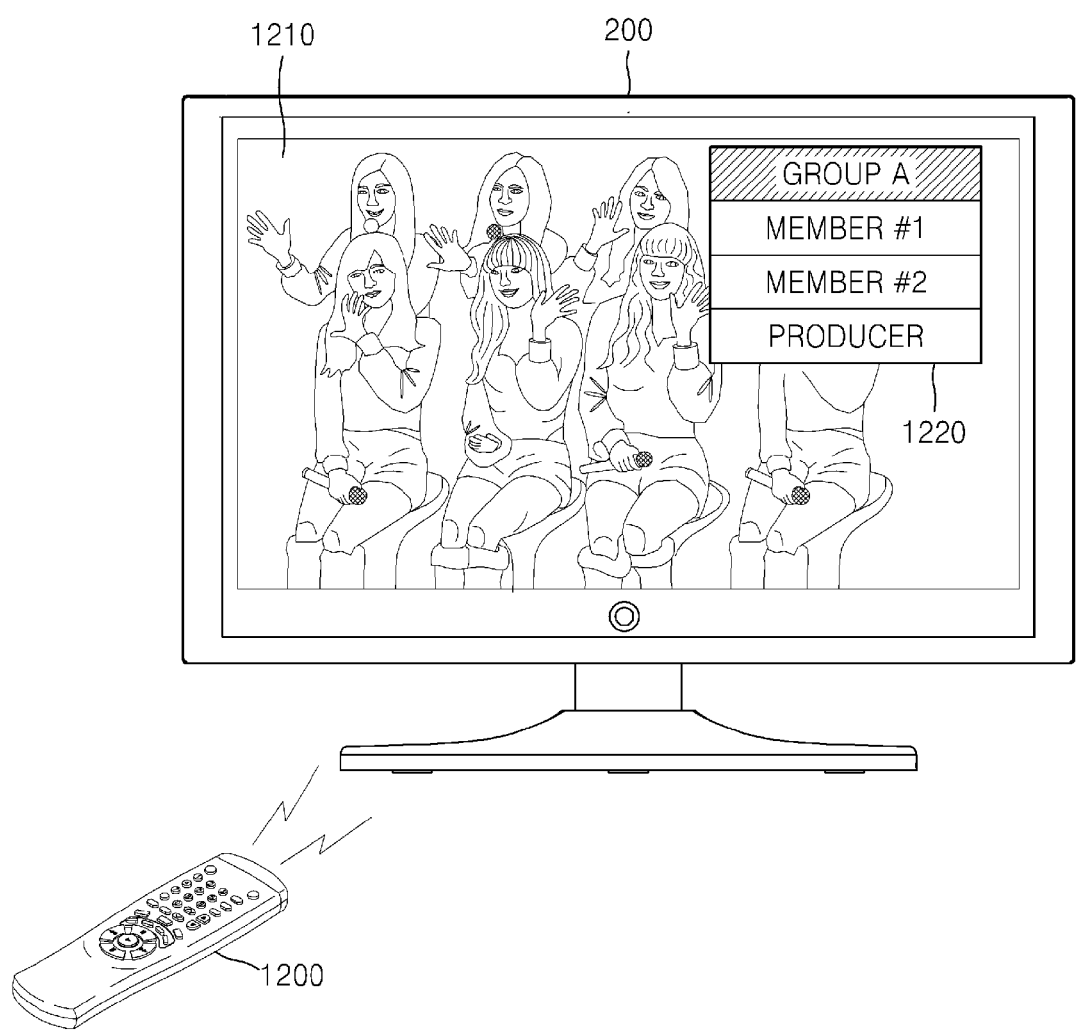
FIGS. 12 and 13 show screens for providing recommendation information in relation to accessed contents, according to exemplary embodiments.
Figure 13:
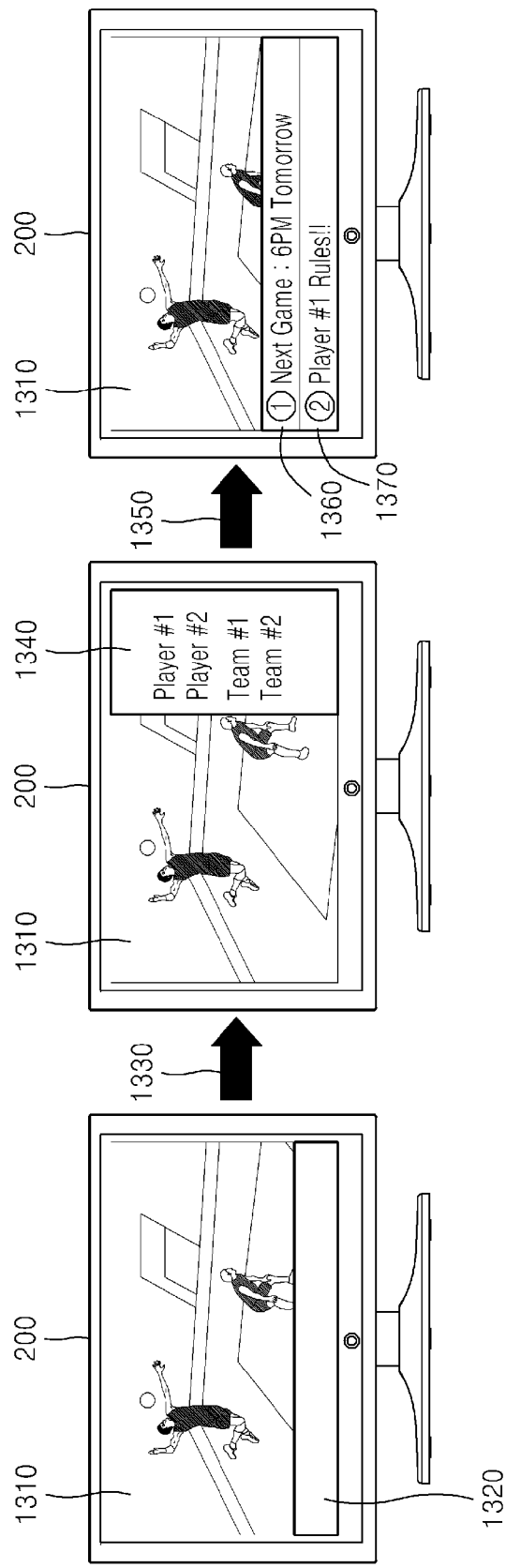

FIGS. 12 and 13 show screens for providing recommendation information in relation to accessed contents, according to exemplary embodiments.

If a TV user 1200 views a current content 1210, the TV content sharing server 100 may provide recommendation information 1220 of characters of the accessed content 1210.

For example, if the current content 1210 includes a plurality of characters, the recommendation information 1220 may be displayed on a screen so as to encourage to access with respect to each character. Alternatively, the recommendation information 1220 may include official website information or SNS account information of the characters.

Alternatively, the recommendation information 1220 may include information regarding another TV content on which the characters appear. Also, official website information or SNS account information of a producer of the current content 1210 may be included in the recommendation information 1220.

According to an exemplary embodiment, log information of the TV user 1200 may be transmitted to the TV content sharing server 100. The TV content sharing server 100 may automatically map the log information of the TV user 1200 to the characters and may store it as personal information.

If the TV user 1200 merely accesses the current content 1210, since the content accessed by the TV user 1200 is grouped with another content or menu closely related to the current content 1210, the TV user 1200 may obtain wider SNS information or broadcast information regarding the newly generated group.

If a TV content is a sport game content 1310, in general, a TV user has an obvious preference on a sport team or player. Accordingly, the TV content sharing server 100 may analyze preference information regarding a preferred team or player of the TV user in each sport category.

Also, the TV content sharing server 100 may provide related service information such as recommendation TV content information, community information, related SNS information, and shopping information based on the preference information of the TV user on the sport game content 1310.

For example, if the TV user checks in the sport game content 1310, the TV content sharing server 100 may ask the TV user by using a preference survey window 1320 whether the current game is a game of a preferred team or player. If the TV user represents acknowledgement (1330), the TV content sharing server 100 may ask a preferred team or player from among teams or players of the current game (1340). If the TV user selects a predetermined team or player, the TV content sharing server 100 may search for related service information based on a selection result. For example, the TV content sharing server 100 may provide broadcast schedule information 1360 of a next game of the team or player preferred by the TV user, or may display cheering phrase information 1370 for a predetermined team or player, together with a TV content.

Figure 14:
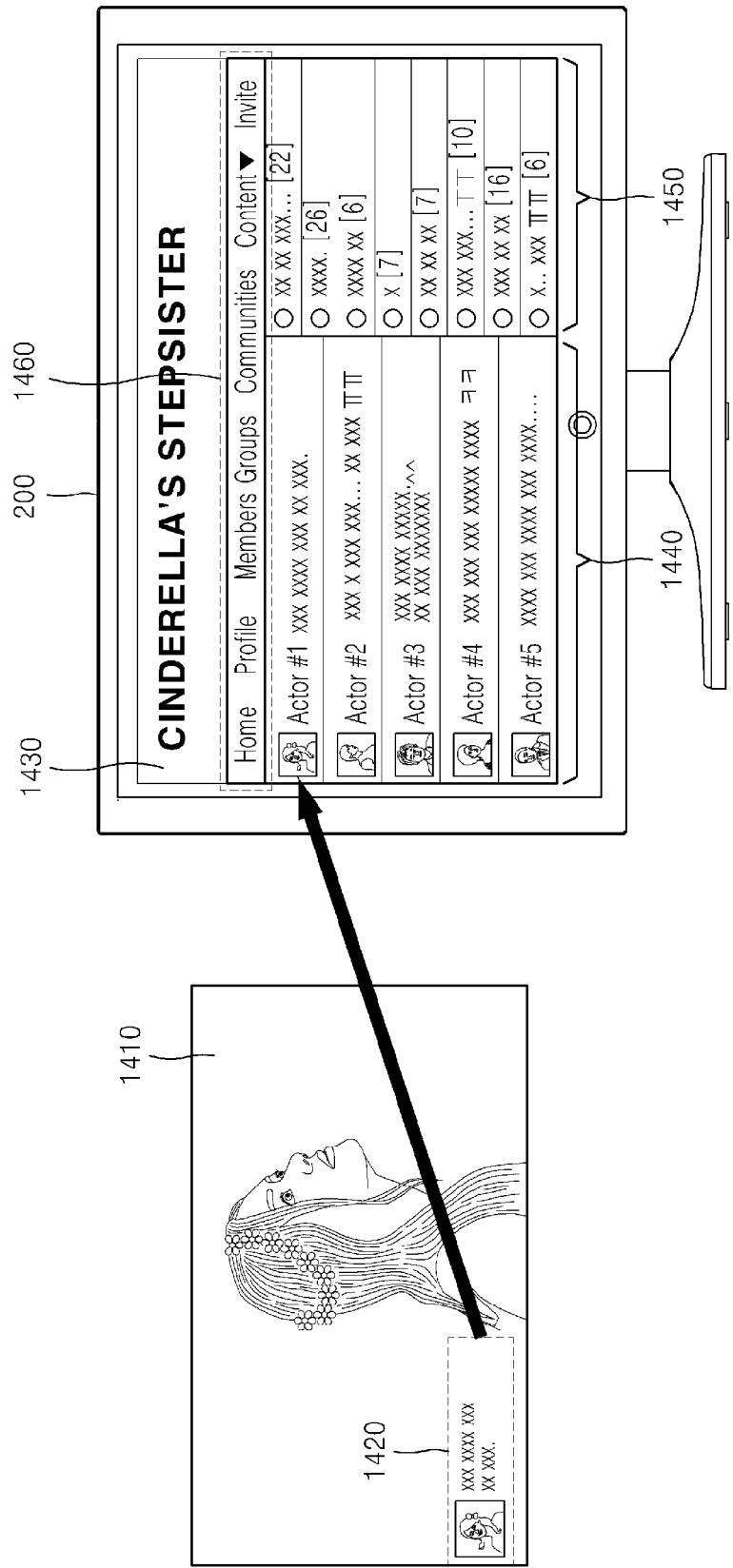
FIG. 14 shows a screen of a content-based community service provided by using a TV content sharing service, according to an exemplary embodiment.

FIG. 14 shows a screen of a content-based community service provided by using a TV content sharing service, according to an exemplary embodiment.

The TV content sharing server 100 may provide TV content-based community information to TV users.

For example, the TV content sharing server 100 may operate a community 1430 regarding a TV content 1410, and users who check in the TV content 1410 may participate in the community 1430. The community 1430 regarding the TV content 1410 may be generated based on content properties such as a title, casts, crews, and background music of the TV content 1410.

The community 1430 regarding the TV content 1410 may provide auxiliary menus 1460 regarding the TV content 1410, for example, 'Members (cast information)' and 'Profile (content information)'.

By using a 'Communities' menu from among the auxiliary menus 1460, various bulletin board services may be provided. A bulletin board service of a community 1430 may include an exclusive bulletin board 1440 for postings of people having high reliabilities on the TV content 1410 (for example, casts, crews, and experts), and a general bulletin board 1450 for postings of general users. Only posting data of the exclusive bulletin board 1440 may be filtered and displayed in the form of a ticker 1420 on a play screen of the TV content 1410.

The community 1430 may be connected with another bulletin board related to the TV content 1410. Communities provided by the TV content sharing server 100 may recommend each other.

Figure 15:
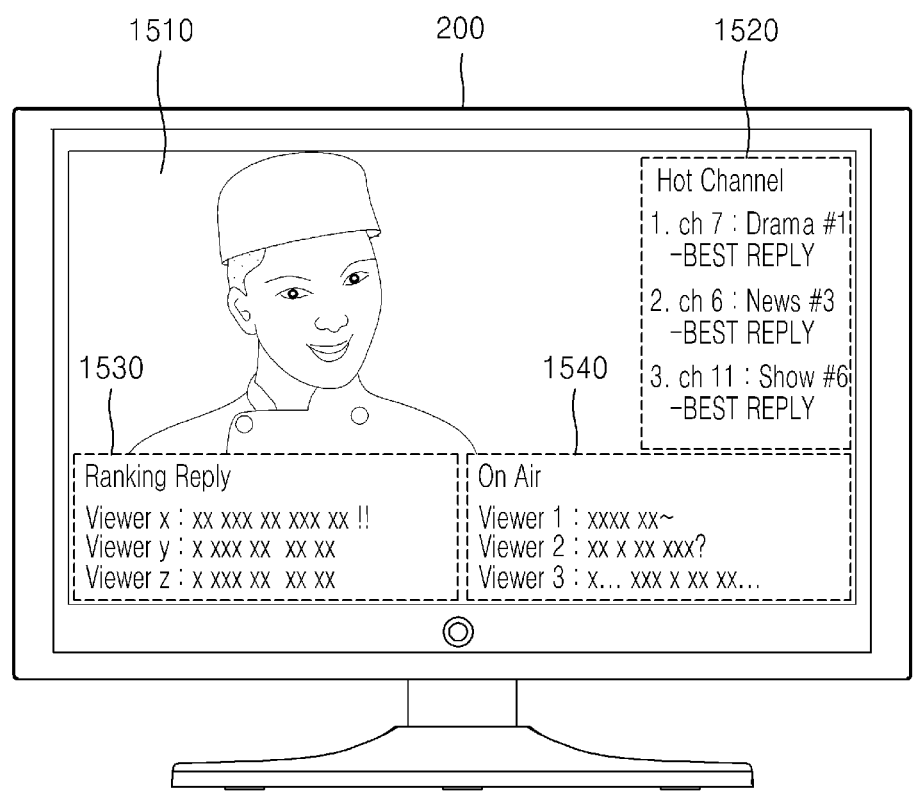
FIG. 15 shows a screen of a real-time-reply-based service provided by using a TV content sharing service, according to an exemplary embodiment.

FIG. 15 shows a screen of a real-time-reply-based service provided by using a TV content sharing service, according to an exemplary embodiment.

TV users may watch a TV content and then may share their opinions and impressions by using real-time replies. As such, the TV content sharing server 100 may receive from logged-in TV users a request to display real-time replies. Also, by using the real-time replies of the TV users, the TV content sharing server 100 may provide a real-time-reply-based service including an audience rating comparing service and a reply ranking service in addition to a real-time reply viewing service of the TV users.

For example, the TV device 200 may receive the real-time-reply-based service from the TV content sharing server 100 and may display a real-time-reply-based audience rating display window 1520, a real-time reply ranking display window 1530, and a real-time reply display window 1540 on a play screen of a current content 1510.

For example, the real-time-reply-based audience rating display window 1520 may display a list of broadcast channels in an order that real-time replies are actively posted. According to a selection of the TV user, a current channel may be switched to a selected channel.

For example, the real-time reply ranking display window 1530 may display a list of replies in an order that the number of hits or likes is high. This may cause competition in posting replies and thus TV users may actively participate in posting replies.

For example, the real-time reply display window 1540 may display real-time replies regarding the current TV content 1510.

Figure 16:
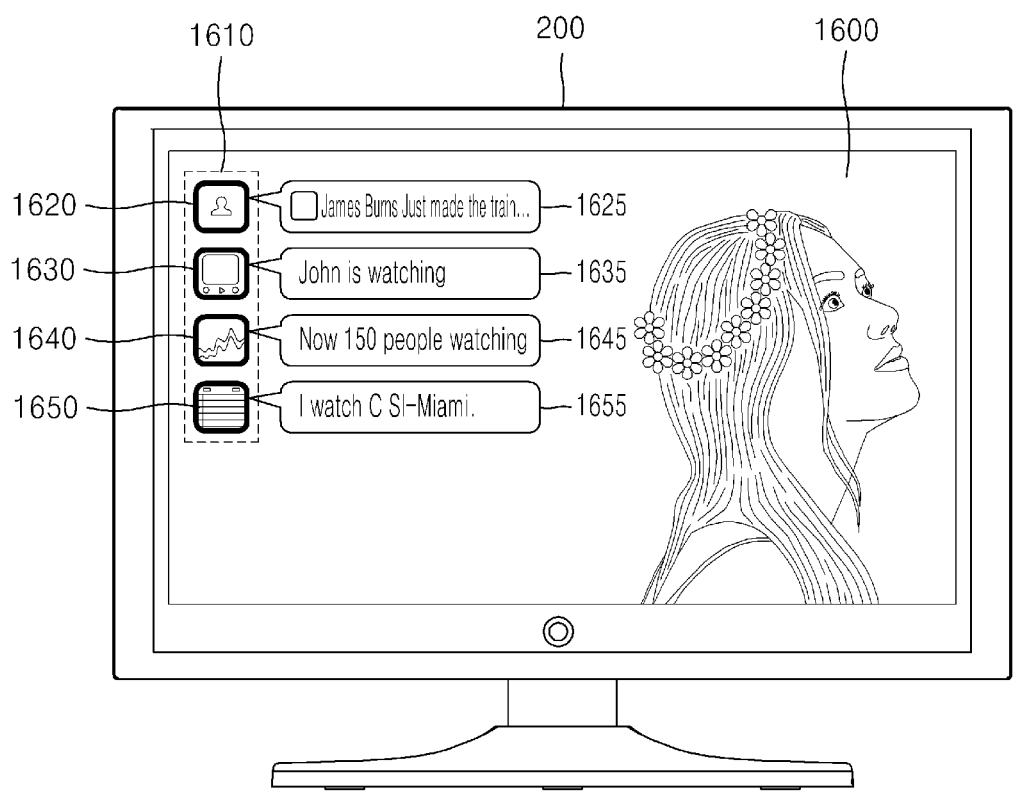
FIGS. 16, 17 and 18 show user interface screens for realizing a TV content sharing service, according to exemplary embodiments.
Figure 17:
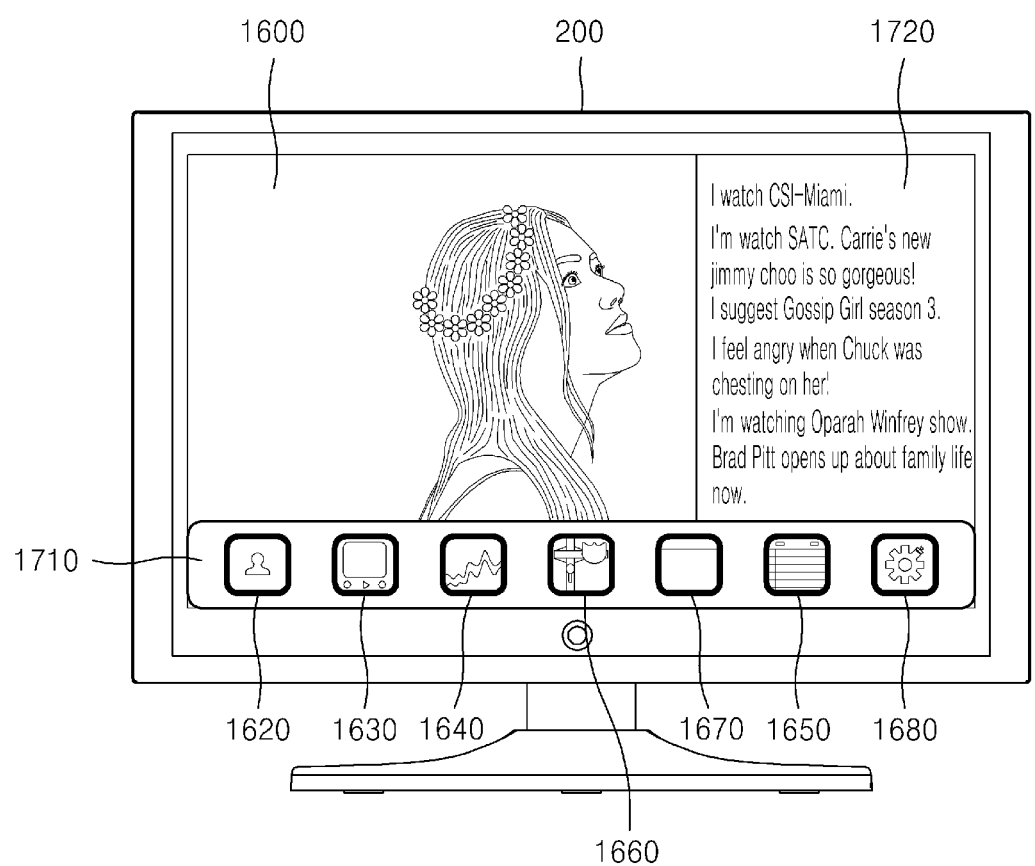
Figure 18:
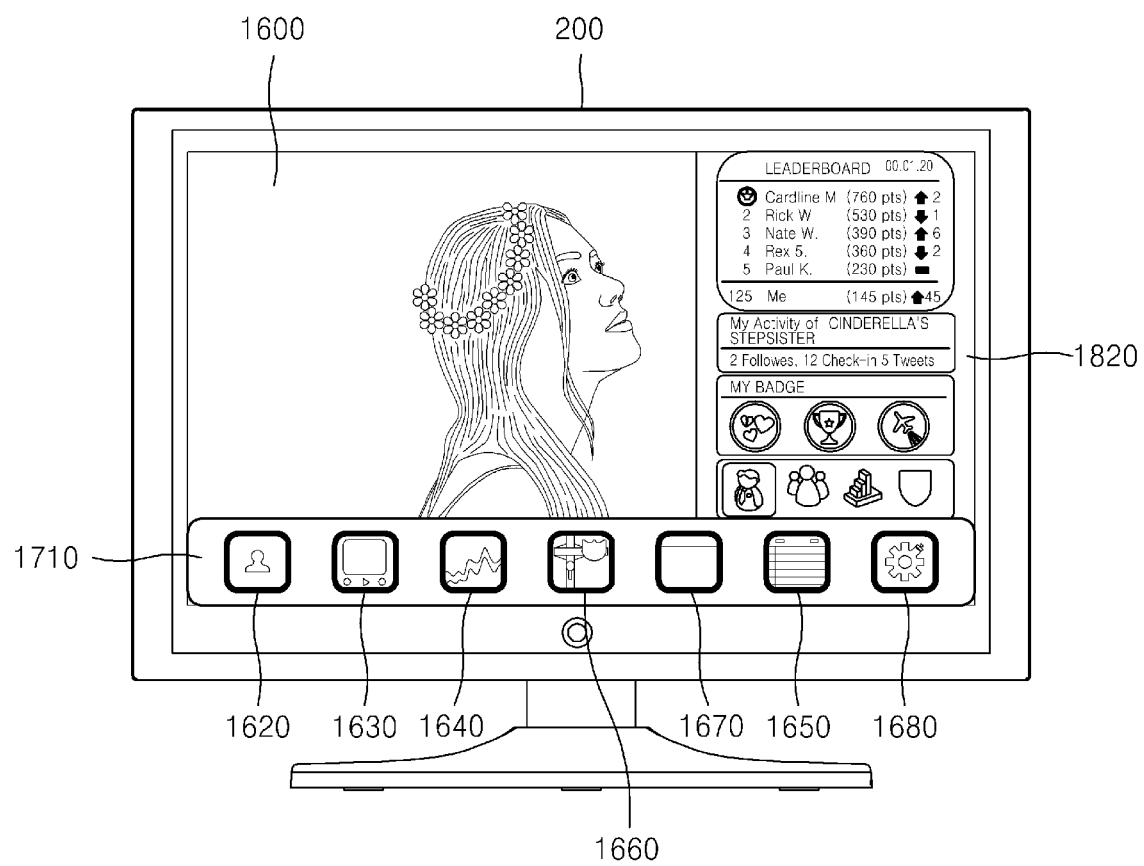

FIGS. 16, 17 and 18 show user interface screens for realizing a TV content sharing service, according to exemplary embodiments.

The TV content sharing server 100 may provide a graphic user interface for displaying content sharing information and detailed access information in such a way that they do not interrupt a TV user who watches a TV content 1600. Also, the TV device 200 itself may form a graphic user interface in such a way that the TV content sharing information and the detailed access information received from the TV content sharing server 100 do not interrupt the TV user who watches the TV content 1600.

For example, a graphic user interface of FIG. 16 shows a play screen of the TV content 1600, in which only a minimum number of icons 1620, 1630, 1640, and 1650 are displayed on a minimum-sized detailed check-in information window 1610 in order not to interrupt the TV user who watches the TV content 1600. If one of the icons 1620, 1630, 1640, and 1650 is selected, only a speech bubble 1625, 1635, 1645, or 1655 is spread to display a description of the selected icon. In this case, the icons 1620, 1630, 1640, and 1650 displayed on the detailed access information window 1610 may be set by the TV user.

A graphic user interface of FIG. 17 shows main menus when a TV content sharing service based on a social network is checked in. A detailed access information window 1710 including SNS information is located and essential icons 1620, 1630, 1640, 1650, 1660, 1670, and 1680 are displayed on a bottom portion of the play screen of the checked-in TV content 1600. If one of the icons 1620, 1630, 1640, 1650, 1660, 1670, and 1680 is selected, a description of the selected icon may be displayed on a right window 1720 of the play screen of the TV content 1600. For example, opinions of other TV users may be shared by using an SNS.

A graphic user interface of FIG. 18 shows participation reward menus for encouraging active participation of TV users who check in the TV content sharing service based on a social network. The detailed access information window 1710 including the main menus may be located on the bottom portion of the play screen of the TV content 1600, and the number of accesses, a ranking, a master user, a badge of a current TV user, a coupon, etc. may be displayed on a right window 1820 of the play screen of the TV content 1600.

Figure 19:
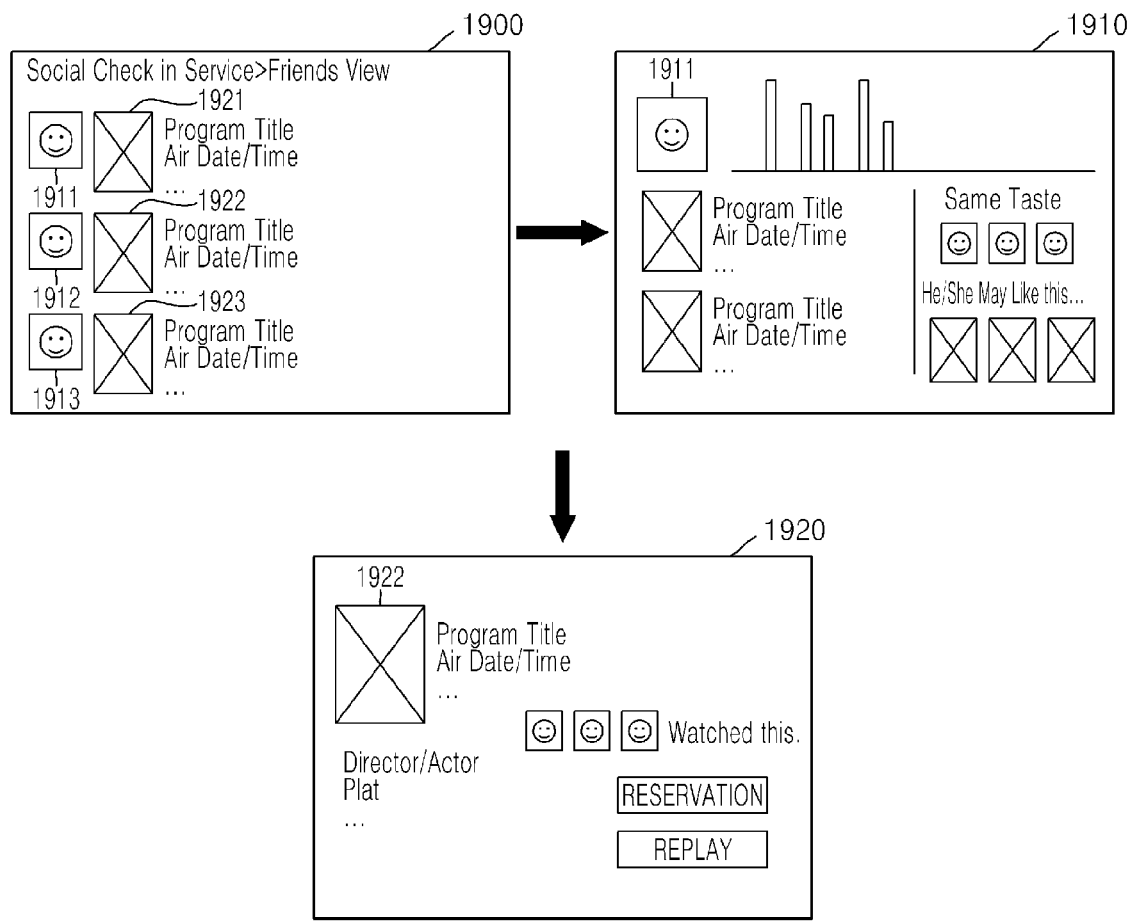
FIG. 19 shows detailed other-user information provided by using a TV content sharing service, according to an exemplary embodiment.

FIG. 19 shows detailed other-user information provided by using a TV content sharing service, according to an exemplary embodiment.

A friend list window 1900 for displaying a friend list as one of group of interest information of detailed access information may display icons 1911, 1912, and 1913 of TV users registered as friends of a current TV user, and content icons 1921, 1922, and 1923 representing contents that they recently watch. For example, the icons 1911, 1912, and 1913 of the friends may be aligned in an order from a recently checked-in user.

From among the icons 1911, 1912, and 1913 of the friends, if a predetermined icon 1911 is selected, a detailed information window 1910 for displaying detailed information regarding a user of the selected icon 1911 may be displayed. For example, the detailed information window 1910 may display a preference graph of each content category, a list of contents recently watched, common tastes with the current TV user, and preference/non-preference information.

From among the content icons 1921, 1922, and 1923, if a predetermined icon 1922 is selected, a detailed information window 1920 for displaying detailed information regarding the content corresponding to the selected icon 1922 may be displayed. For example, the detailed information window 1920 may display crew information of the content, cast information, information regarding friends who check in the content, a reservation button, and a replay button.

Figure 20:
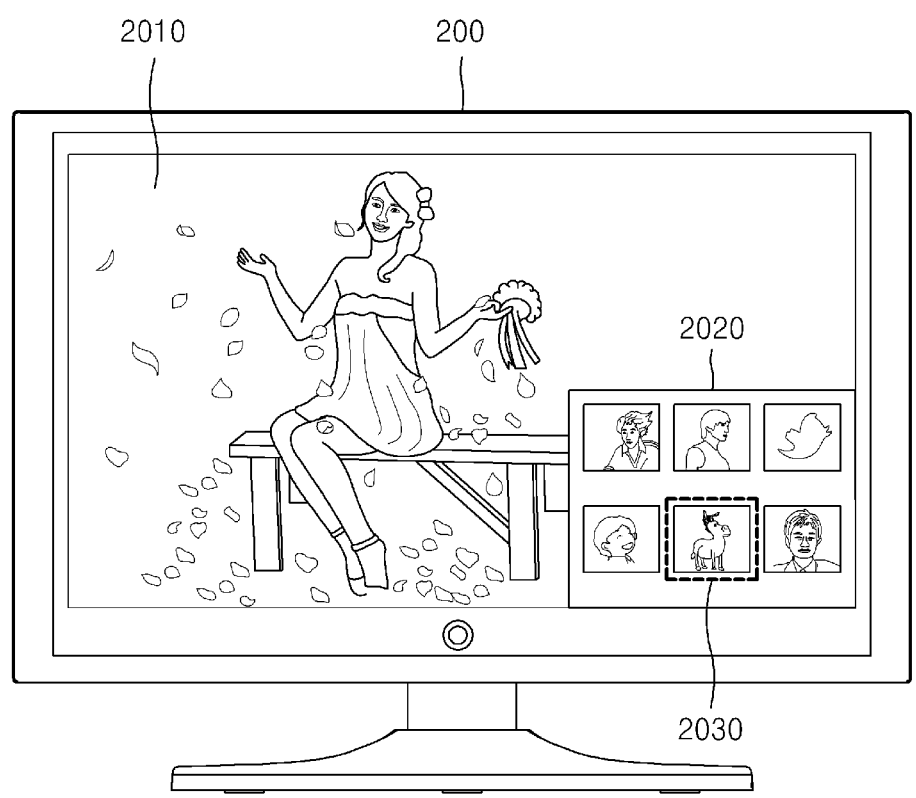
FIGS. 20 and 21 respectively show a screen for displaying a friend list provided by using a TV content sharing service and a screen for sharing opinions with a friend who also watches a TV content, according to exemplary embodiments.
Figure 21:
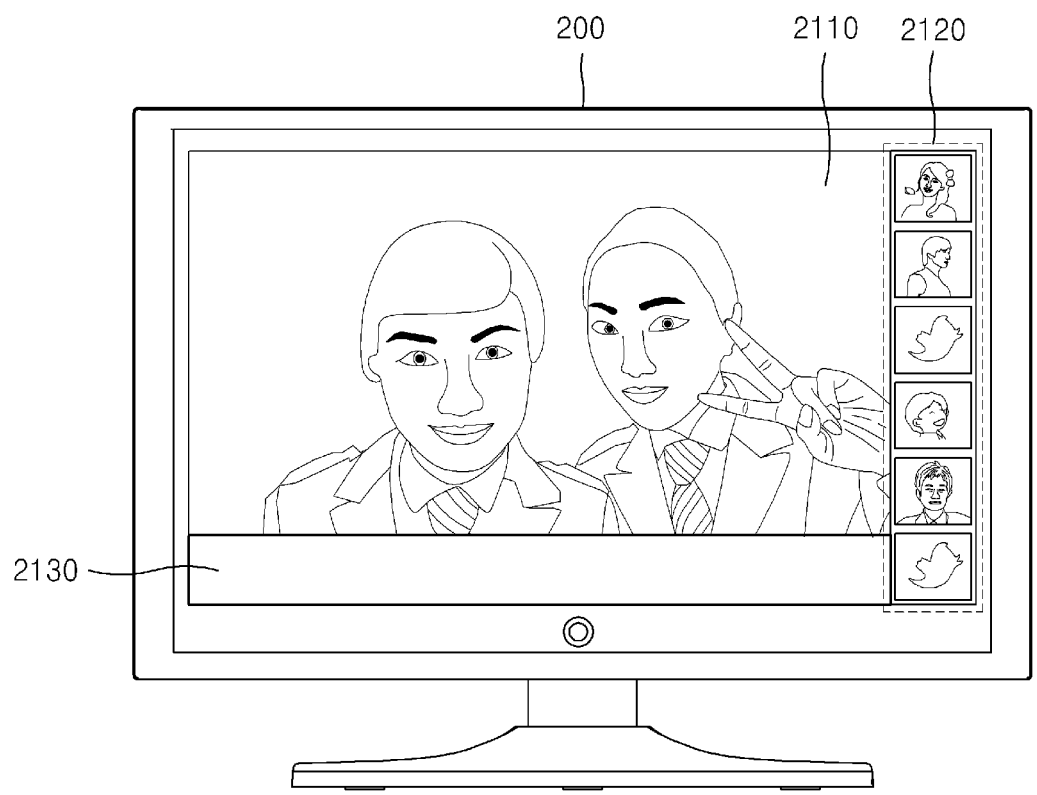

FIGS. 20 and 21 respectively show a screen for displaying a friend list provided by using a TV content sharing service and a screen for sharing opinions with a friend who also watches a TV content, according to exemplary embodiments.

If a TV user desires to watch a TV content 2010 together with a friend while the TV user watches the TV content 2010, the TV user may request the TV content sharing server 100 to check in. If the TV user logs in, a logged-in status of the TV user may be informed to friends who are already logged in.

The TV user may request the TV content sharing server 100 for group of interest information and may receive it. The TV device 200 may display a friend list 2020 of users of interest on a play screen of the TV content 2010 based on the group of interest information.

The TV user may be switched a mode of the TV device 200 to a watch together mode in order to share the TV content 2010 with a friend. The TV user may select on the friend list 2020 a friend 2030 who the TV user desires to watch the TV content 2010 together and may request to 'watch together'. If the friend 2030 currently watches the TV content 2010, the TV user may simply request to 'watch together'. The friend 2030 currently watches a content other than the TV content 2010, the TV user may recommend the friend 2030 to 'watch together' the current TV content 2010.

If the friend 2030 accepts to 'watch together', a 'watch together' service may be started. The 'watch together' service is a service for allowing a content to be shared with a friend and allowing opinions regarding the content to be shared in real time. Opinions between users may be transceived by using text chatting, emoticons, avatars, or Internet phones. For example, according to properties of a content such as a live content, a video on demand (VOD) content, a photographic content, or a music content, the opinion sharing method may vary.

If a friend who the TV user desires to watch a current content together does not check in the current content, a list of logged-in friends may be found and the TV user may move to a content currently accessed by the friend. The TV user may request the friend to 'watch together' the new content.

Based on a text chatting method as one of opinion sharing methods according to the 'watch together' service, the TV user may transceive text messages to and from the friend by using the smart device 300 while watching the content on the TV device 200 together with the friend.

Also, the TV user may watch one content together with a plurality of friends. The friend list window 2120 for displaying icons or avatars of friends who currently watch the content together may be displayed on a side portion of a content play screen 2110 of the TV device 200.

An active state of each friend may be displayed as a color of an icon or an avatar. Also, when the friend enters or exits, an icon may be activated to a gesture for saying hi or good-bye. An emotion such as like or dislike of the friend may be displayed as a thumbs up or a thumbs down. An opinion of the friend may be displayed in a speech balloon spread from an icon.

A chatting text received from the friend may be displayed on a chatting window 2130 at a bottom portion of the content play screen 2110 of the TV device 200.

Based on an emoticon or avatar method as one of opinion sharing methods according to the 'watch together' service, the TV user and the friend may provide an animation effect on the content play screen 2110 or may display an emoticon representing an emotion or an item gift for the other on the chatting window 2130 while watching the content on the TV device 200 together. By using the smart device 300 such as a third party device, an auxiliary TV, or a portable device, a picture may be drawn on the content play screen 2110 or a text message may be transmitted.

Based on a voice chatting method as one of opinion sharing methods according to the 'watch together' service, the TV user and the friend may share their opinions by using headsets having microphones for allowing wireless communications with the TV device 200 or the smart device 300 while watching the content on the TV device 200 together. A voice signal input via the microphone of the headset may be transformed into a text signal by the smart device 300 and may be displayed on the chatting window 2130 of the TV device 200.

Also, detailed access information may be checked and detailed opinions an emotions may be shared with friends on the smart device 300 while watching the content play screen 2110 on the TV device 200. However, simple activities such as an entrance, an exit, an exclamation, and a vote may also be displayed on the TV device 200 together with the content play screen 2110.

The TV device 200 may drive a video chatting application. If a content is desired to be shared while the TV user is doing video chatting with friends based on a network provided by the TV content sharing server 100, the content may be played on the TV device 200 to share the content with the friends. Various contents such as a photo, a video, music, a document, a calendar, an application, and a TV content may be shared during video chatting.

Content sharing due to video chatting may be realized by using a mashup service in which a peer-to-peer (P2P) method, a personal cloud method, and a home network method are combined. Also, contents stored in an embedded memory, an all-share home network system, an external memory, and a cloud server may be shared.

Figure 22:
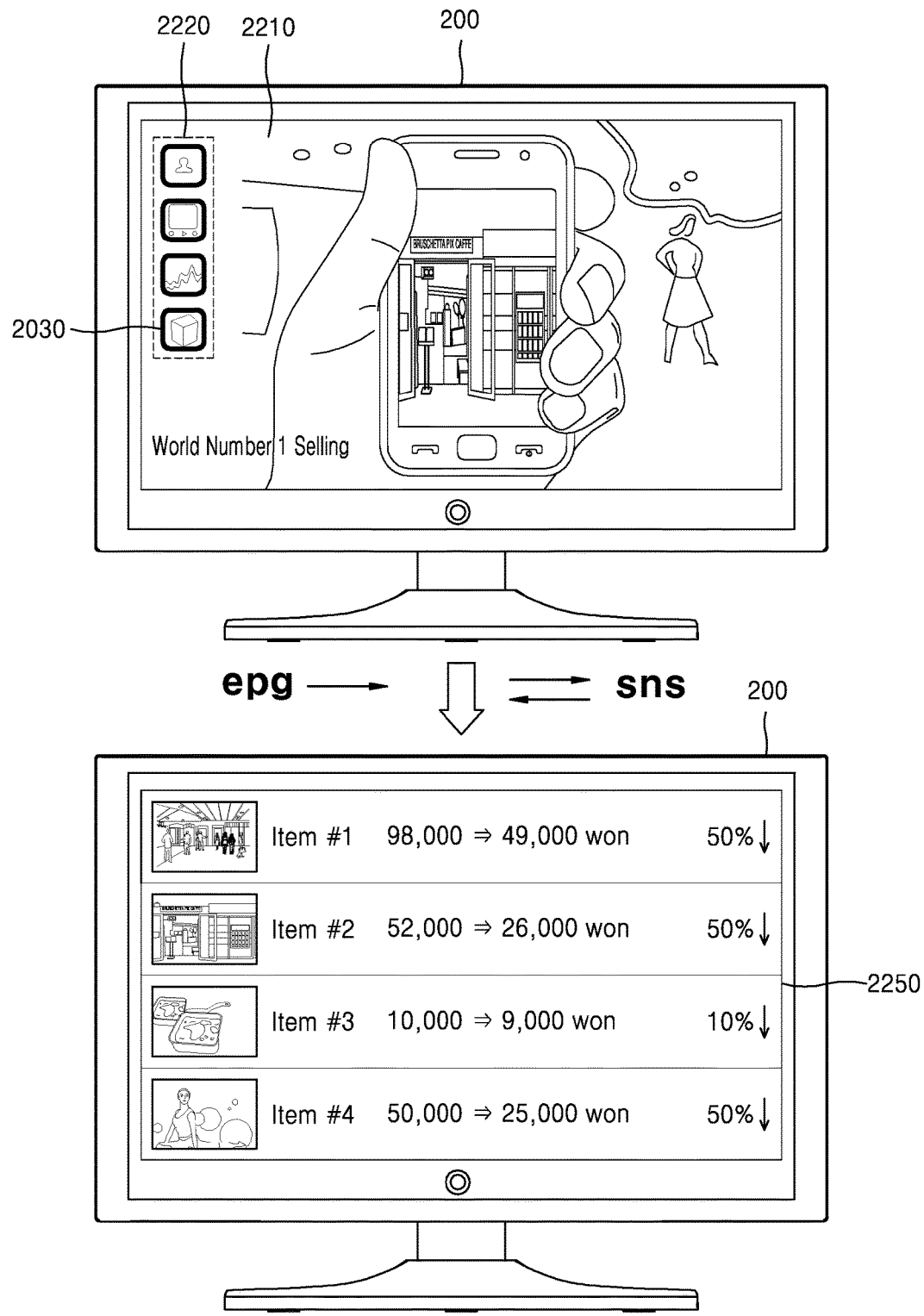
FIG. 22 shows a social commerce service related to a TV content provided by using a TV content sharing service, according to an exemplary embodiment.

FIG. 22 shows a social commerce service related to a TV content provided by using a TV content sharing service, according to an exemplary embodiment.

A TV user may receive product item information related to a TV content 2210 from the TV content sharing server 100 by using the TV device 200 while, before, or after watching the TV content 2210. If the TV user selects a social commerce menu 2230 on a detailed access information window 2220, a list of items related to the TV content 2210 may be displayed on a content-related product window 2250. By using metadata of an electronic program guide (EPG) from the TV content sharing server 100, item information related to the TV content 2210 and item purchase opinion information collected by using an SNS may be combined to display purchase-recommendable items related to the TV content 2210 on the content-related product window 2250.

The TV user may easily purchase an item by clicking one of the items listed on the content-related product window 2250.

Also, the content-related product window 2250 may display purchase history information of a plurality of previously checked-in TV users and members of a community group such as an SNS. The TV user may compare a current price to previous prices of the other users.

Furthermore, the content-related product window 2250 may display purchase opinions, e.g., reviews, of a plurality of previously logged-in TV users and members of a community group such as an SNS. The TV user may decide whether to purchase the item with reference to the purchase opinions of other users, which are relatively reasonable and reliable in comparison to product commercials.

Besides, since social commerce activities such as a group purchase with currently checked-in users and community members are allowed, the TV user may purchase the item related to the TV content 2210 at a lower price.

In addition, based on a region where the TV device 200 of the TV user is located, product information that is more appropriate for the region where the TV user lives may be easily found.

The TV content sharing server 100 may provide local information by using a social network to users who live at the same region from among users of interest of the TV user and real-time viewers.

For example, the TV content sharing server 100 may provide local information for local residents according to categories. For example, the categories may include park/amusement park, terrain, bar/club, coffee shop, restaurant, accommodation, bank/automated teller machine (ATM), gas station, grocery store, major store, video/digital versatile disc (DVD) rental store, pharmacy, shopping center, fire station, hospital/clinic, temple, school, and transportation facility. The TV user may access a desired one of the categories of the local information provided from the TV content sharing server 100, and may obtain information corresponding to the accessed category.

For example, from among the categories of the local information provided from the TV content sharing server 100, if the TV user accesses the hospital/clinic category, all hospitals and clinics such as medical clinics, pediatric hospitals, and dental clinics near a house of the TV user are displayed, and reviews of other TV users in relation to each hospital or clinic may be viewed. Also, simple medical information that is searchable by using a social network may be provided and, if a community of users having the same symptom exists, social activities may be allowed.

Figure 23:
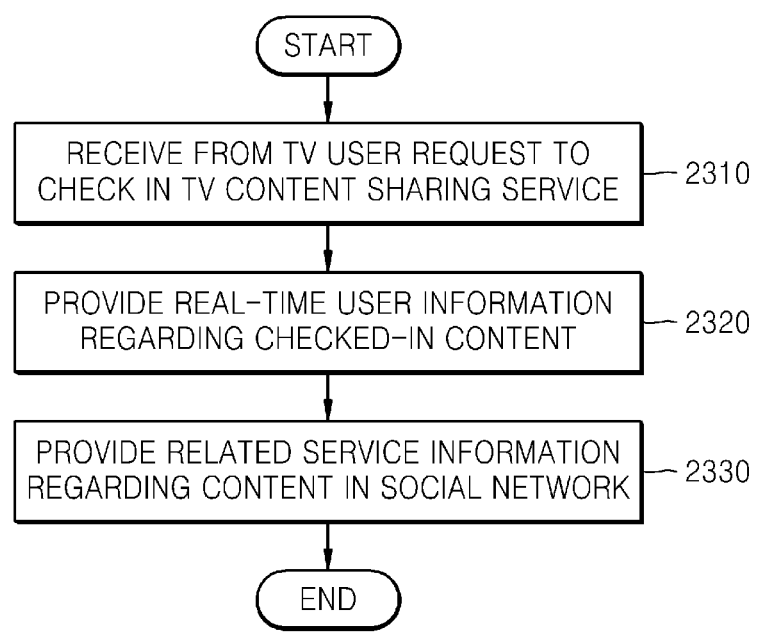
FIG. 23 is a flowchart of a TV content sharing method based on a social network, according to an exemplary embodiment.

FIG. 23 is a flowchart of a TV content sharing method based on a social network, according to an exemplary embodiment.

In operation 2310, a request to check in a TV content sharing service is received from a TV user. The request to check in may be accepted based on personal information of the TV user registered to the TV content sharing server 100.

In operation 2320, real-time user information regarding users who access a content accesses by the TV user, in real time is provided. The real-time user information may include information regarding at least one of a total number of other logged-in users who watch the accessed content in real time, a watch together or conversation function of each TV user, a participation level of each TV user in relation to the accessed content, and users having high participation levels from among the TV user and other users.

In operation 2330, related service information regarding accessible related services in the social network in relation to the accessed content is provided. Related SNS information generated in real time in relation to the accessed content may be found and provided to the TV user.

A request to search for detailed information related to the accessed content may be received from the TV user, and a request to provide a personal posting regarding the accessed content and the found detailed information to a personal SNS account of the TV user may be received.

A request to access may be received from an auxiliary smart device other than a main TV of the TV user. Detailed access information including the real-time user information and the related service information regarding a requested content may be provided to the auxiliary smart device.

A social community service based on the accessed content may be provided to the TV user who accesses the content. Information regarding an official website or an official SNS account connected to a social community and related to the accessed content may also be provided.

Real-time reply information regarding the accessed content may be received from the TV user, and at least one of a watching encouraging service, a reply participating service, and a reply viewing service may be provided based on the real-time reply information.

Group of interest information regarding a group of interest including users of interest of the TV user may be provided to the TV user. The group of interest information may include status information regarding access states of and contents watched by the users of interest. A request to watch together with a first user from among the users of interest may be received from the TV user. An opinion sharing service regarding the accessed content may be provided between the TV user and the first user who accepts to watch together.

Social commerce information including at least one of purchase histories, purchase opinions, and purchase statuses of items related to the accessed content, which are obtained from TV users, may be provided to the TV user.

According to an exemplary embodiment, the TV content sharing server 100 may be a server for managing only the detailed access information or TV content sharing information. According to another exemplary embodiment, the TV content sharing server 100 may transmit a broadcast stream including a TV content as well as the TV content sharing information.

Figure 24:
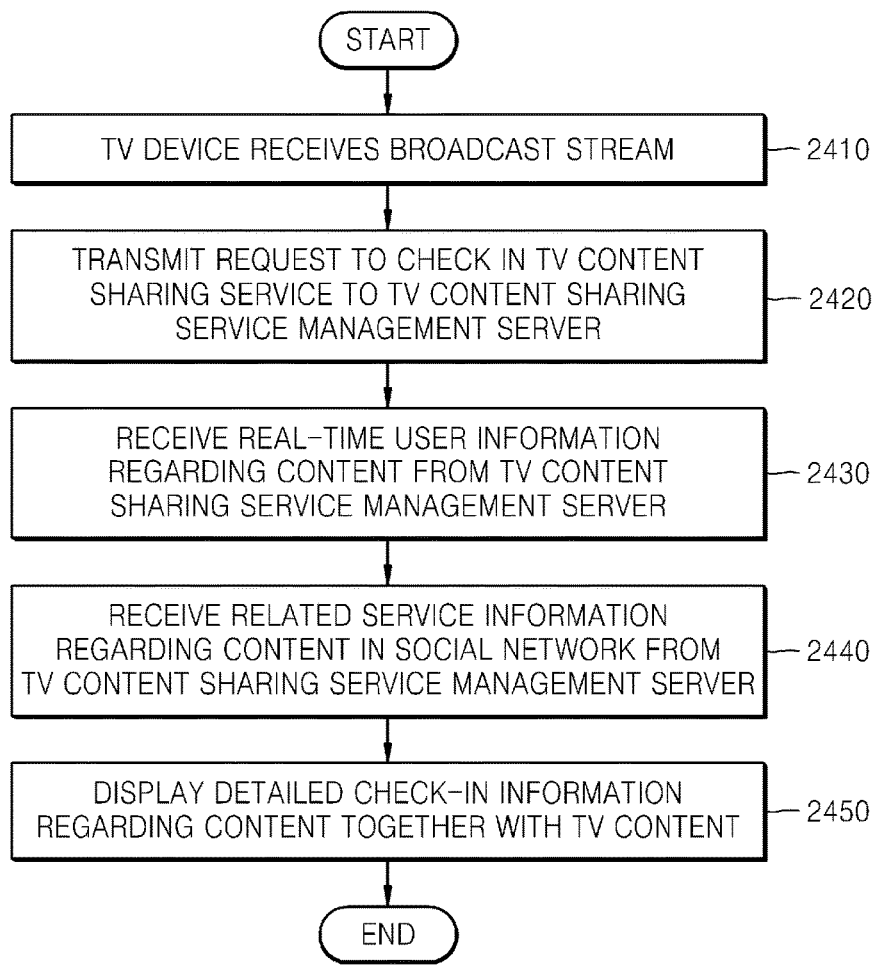
FIG. 24 is a flowchart of a TV broadcast service receiving method by a TV device based on a social network, according to an exemplary embodiment.

FIG. 24 is a flowchart of a TV broadcast service receiving method by the TV device 200 based on a social network, according to an exemplary embodiment.

In operation 2410, the TV device 200 receives a broadcast stream.

In operation 2420, the TV device 200 receives from a TV user a request to access a TV content sharing service for providing TV-content-related information to a plurality of TV users, and transmits the request to the TV content sharing server 100.

In operation 2430, real-time user information regarding users who access a content accessed by the TV user, in real time is received from the TV content sharing server 100.

In operation 2440, related service information regarding accessible related services in the social network in relation to the accessed content is received from the TV content sharing server 100.

In operation 2450, detailed access information including the real-time user information and the related service information regarding the accessed content is displayed together with a TV content extracted from the received broadcast stream.

A request to search for related SNS information generated in real time in relation to the accessed content may be transmitted to the TV content sharing server 100. The found related SNS information may be received.

Recommendation information regarding a target closely related to the accessed content in the social network may be received from the TV content sharing server 100.

A request to search for detailed information related to the accessed content may be transmitted to the TV content sharing server 100, and a request to provide a personal posting regarding the detailed information of the accessed content to a personal SNS account may be transmitted.

A request to display real-time reply information regarding the accessed content may be transmitted to the TV content sharing server 100, and the real-time reply information of the TV user and real-time users may received. At least one of a watching encouraging service, a reply participating service, and a reply viewing service may be received based on the real-time reply information.

Group of interest information of the TV user may be received from the TV content sharing server 100. A request to watch together with a first user from among users of interest may be transmitted to the TV content sharing server 100, and an opinion sharing service regarding the checked-in content between the TV user and the first user who accepts to watch together may be received.

Social commerce information including at least one of purchase histories, purchase opinions, and purchase statuses of items related to the accessed content, which are obtained from TV users, may be received from the TV content sharing server 100.

Figure 25:
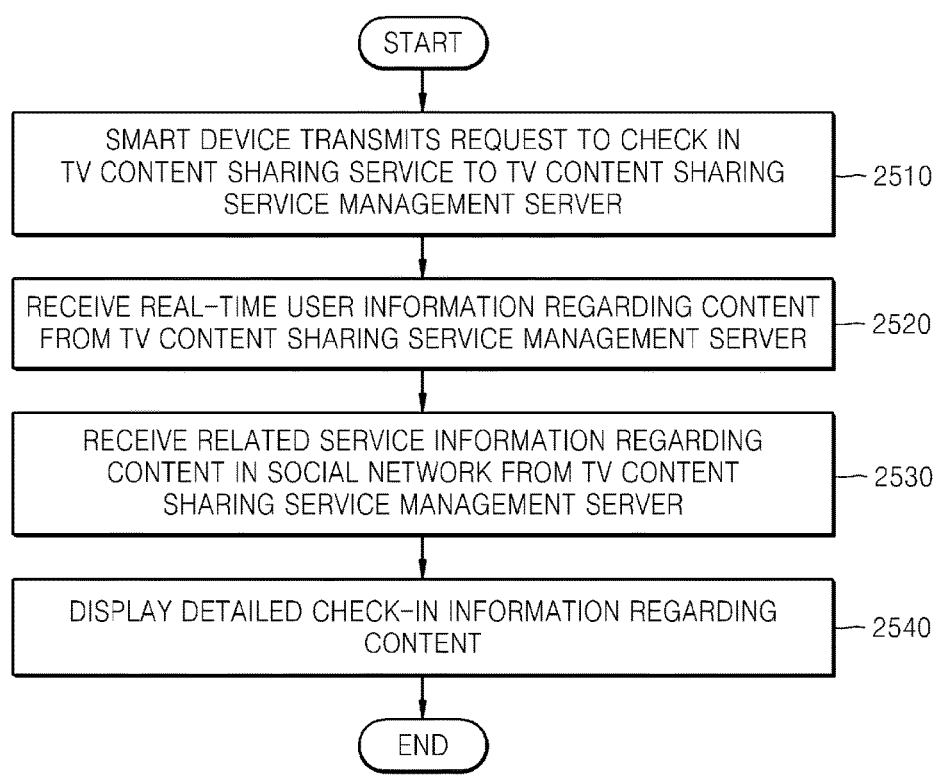
FIG. 25 is a flowchart of a TV broadcast service receiving method by a smart device based on a social network, according to an exemplary embodiment.

FIG. 25 is a flowchart of a TV broadcast service receiving method by the smart device 300 based on a social network, according to an exemplary embodiment.

In operation 2510, the smart device 300 receives from a TV user having the TV device 200 a request to check in a TV content sharing service for providing TV-content-related information to a plurality of TV users, and transmits the request to the TV content sharing server 100.

In operation 2520, real-time user information regarding a content accessed by the TV user is received from the TV content sharing server 100.

In operation 2530, related service information regarding accessible related services in the social network in relation to the accessed content is received from the TV content sharing server 100.

In operation 2540, detailed access information including the real-time user information and the related service information regarding the accessed content is displayed.

After the TV user logs in by using the smart device 300, if a request of the TV user is transmitted via the smart device 300 to the TV content sharing server 100, in relation to a TV content displayed on the TV device 200 of the TV user, the detailed access information and SNS information regarding the accessed content may be displayed on the smart device 300.

Exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

While the exemplary embodiments have been particularly shown and described, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

The invention claimed is:

1. A television (TV) content sharing method for providing TV-content-related information to a TV user who accesses content, the method comprising:
   receiving from the TV user a request to access the content and displaying the content on a TV;
   permitting to access the content based on whether the TV device is registered as a TV device of the TV user;
   providing real-time user information regarding users who access content accessed by the TV user, in real time to the TV device; and
   providing related service information including information of a plurality of social networking services (SNS) that enable the TV user to share information about the accessed content with users of the SNS to the TV device,
   wherein the real-time user information includes information which indicates how many users access the content, and
   wherein the real-time user information and related service information are displayed simultaneously with the accessed content.

2. The method of claim 1, wherein the displaying of the information for accessing the plurality of social networking services further comprises:
   accessing social network service (SNS) information that is related to the accessed content generated in real time in at least one of an exclusive posting community forum and a general posting community forum of the social network related to the accessed content; and
   displaying the SNS information on the TV.

3. The method of claim 1, further comprising:
   receiving a request to log in to the SNS from an auxiliary smart device other than a main TV of the TV user; and
   transmitting the real-time user information and the related service information for accessing the plurality of social networking services to the auxiliary smart device.

4. The method of claim 1, further comprising:
   providing to the TV user group of interest information of a group of users related to the TV user, the group of interest information comprising status information regarding access states of the group of users and contents watched by the group of users;
   receiving from the TV user a request to watch content together with another user from among the group of users; and
   providing an opinion sharing service regarding the accessed content between the TV user and the other user,
   wherein the opinion sharing service comprises at least one service from among text chatting, voice chatting, and video chatting between the TV user and the other user.

5. The method of claim 4, further comprising providing to the TV user social commerce information comprising at least one of purchase histories, purchase opinions, and purchase statuses of items related to the accessed content, which are obtained from at least one user from among the group of users and real-time viewers.

6. A television (TV) broadcast service receiving method for receiving TV-content-related information by a TV device, the method comprising:
   receiving a broadcast stream;
   receiving from a TV user a request to access content for providing the TV-content-related information to a plurality of TV users, and transmitting the request to a TV content sharing service management server;
   receiving from the TV content sharing service management server real-time user information regarding users who access content accessed by the TV user, in real time;
   receiving from the TV content sharing service management server related service information including information of a plurality of social networking services (SNS) that enable the TV user to share information about the accessed content with users of the SNS; and
   displaying the real-time user information and the information for accessing the social networking services of the SNS together with a content extracted from the received broadcast stream,
   wherein the real-time user information includes information which indicates how many users access the content;

wherein the real-time user information and related service information are displayed simultaneously with the accessed content, and wherein the real-time user information and related service information are received when the TV content sharing service management server permits to access the content based on whether the TV device is registered as a TV device of the TV user.

7. The method of claim 6, wherein the receiving of the real-time user information comprises receiving information regarding at least one of a total number of users who watch the accessed content in real time, a watch together or conversation function of each TV user, a participation level of each TV user in relation to the accessed content, and users having high participation levels from among the TV user and other users, and wherein the receiving of the related service information comprises:

receiving from the TV user a request to access social network service (SNS) information that is related to the accessed content generated in real time that is related to the accessed content, and transmitting the request; and receiving the related SNS information.

8. The method of claim 6, further comprising receiving at least one of an exclusive posting of a community forum and a general posting of a community forum of the social network related to the accessed content.

9. The method of claim 6, further comprising:

receiving group of interest information of a group of users related to the TV user, the group of interest information comprising status information regarding access states of the group of users and contents watched by the group of users;

receiving from the TV user a request to watch content together with a first user from among the group of users, and transmitting the request; and receiving an opinion sharing service regarding the accessed content between the TV user and the first user.

10. The method of claim 9, further comprising receiving social commerce information comprising at least one of purchase histories, purchase opinions, and purchase statuses of items related to the accessed content, which are obtained from at least one user from among the group of users and real-time viewers.

11. A television (TV) broadcast service receiving method for receiving TV-content-related information by using a smart device, the method comprising:

receiving from a TV user having a TV a request to access content for providing the TV-content-related information to a plurality of TV users, and transmitting the request to a TV content sharing service management server by using the smart device;

receiving from the TV content sharing service management server real-time user information regarding users who access content accessed by the TV user, in real time;

receiving from the TV content sharing service management server related service information including information of a plurality of social networking services (SNS) that enable the TV user to share information about the accessed content with the users of the social network services; and displaying on the smart device the real-time user information and the information for accessing the social networking services of the SNS related to a content displayed on a TV device of the TV user, wherein the real-time user information includes information which indicates how many users access the content;

wherein the real-time user information and related service information are displayed simultaneously with the accessed content, and wherein the real-time user information and related service information are received when the TV content sharing service management server permits to access the content based on whether the smart device is registered as a smart device of the TV user.

12. A television (TV) content sharing service management server for providing TV-content-related information to a plurality of TV users, the server comprising:

a check-in management unit configured to receive from a TV user a request to access content and determining whether to permit the TV user to access the content;

a user personal information management unit configured to manage personal information of a plurality of TV users registered to access the TV content sharing service in a social network;

a real-time user information management unit configured to manage real-time user information regarding users who access the content accessed by the TV user, in real time; and a related service information management unit configured to manage related service information including information of a plurality of social network services (SNS) that enable the TV user to share information about the accessed content with users of the SNS, wherein the real-time user information includes information which indicates how many users access the content;

wherein the real-time user information and related service information are displayed simultaneously with the accessed content, and wherein the real-time user information and related service information are provided to the TV device, when the check-in management unit permits to access the content based on whether the TV device is registered, by the user personal information management unit, as a TV device of the TV user.

13. A television (TV) for receiving TV-content-related information, the TV comprising:

a broadcast reception unit configured to receive a broadcast stream;

a user interface unit configured to receive requests from a TV user;

a check-in request unit configured to receive via the user interface unit a request to check in content for providing the TV-content-related information to a plurality of TV users, and transmit the request to a TV content sharing service management server;

a detailed check-in information reception unit configured to receive from the TV content sharing service management server real-time user information regarding users who access content accessed by the TV user, in real time, and related service information for accessing a plurality of social networking services that enable the TV user to share information about the accessed content with the users of the social network service (SNS); and a display unit configured to display the real-time user information and the related service information including information of the plurality of social networking services of the SNS together with a content extracted from the received broadcast stream, wherein the real-time user information includes information which indicates how many users access the content;

wherein the real-time user information and related service information are displayed simultaneously with the accessed content, and wherein the real-time user information and related service information are received when the TV content sharing service management server permits to access the content based on whether the TV is registered as a TV of the TV user.

14. A smart device for receiving TV-content-related information, the smart device comprising:

a user interface unit configured to receive requests from a television (TV) user having the smart device and a TV device;

a check-in request unit configured to receive via the user interface unit from the TV user a request to access a TV content sharing service of a social network for providing the TV-content-related information to a plurality of TV users, and transmit the request to a TV content sharing service management server;

a detailed check-in information reception unit configured to receive from the TV content sharing service management server real-time user information regarding users who access a content accessed by the TV user, in real time, and information including information of a plurality of social networking services that enable the TV user to share information about the accessed content with users of the social network services; and a display unit configured to display the real-time user information and the related service information for accessing the social networking services, wherein the real-time user information includes information which indicates how many users access the content;

wherein the real-time user information and related service information are displayed simultaneously with the accessed content, and wherein the real-time user information and related service information are provided to the smart device when the TV content sharing service management server permits to access the content based on whether the smart device is registered as a smart device of the TV user.

15. A non-transitory computer-readable recording medium having recorded thereon a computer program for executing the method of claim 1.

* * * * *